(12) United States Patent
Nishimura

(10) Patent No.: US 7,852,425 B2
(45) Date of Patent: Dec. 14, 2010

(54) LIQUID CRYSTAL PANEL MODULE AND LIQUID CRYSTAL DISPLAY DEVICE USING THE SAME

(75) Inventor: Hideki Nishimura, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 138 days.

(21) Appl. No.: 11/905,072

(22) Filed: Sep. 27, 2007

(65) Prior Publication Data

US 2008/0079864 A1    Apr. 3, 2008

(30) Foreign Application Priority Data

Sep. 28, 2006    (JP)    .............. 2006-265693

(51) Int. Cl.
*G02F 1/1333*    (2006.01)
(52) U.S. Cl. .......................................... 349/58; 349/59
(58) Field of Classification Search ........................ None
See application file for complete search history.

(56) References Cited

U.S. PATENT DOCUMENTS

| 2002/0097353 | A1* | 7/2002 | Lee ............................. 349/58 |
| 2003/0169383 | A1* | 9/2003 | Kim ............................. 349/58 |
| 2004/0100438 | A1* | 5/2004 | Lee et al. ..................... 345/102 |
| 2005/0024573 | A1* | 2/2005 | Suzuki ......................... 349/149 |
| 2005/0099555 | A1  | 5/2005 | Kim |
| 2006/0061704 | A1* | 3/2006 | Hayano et al. ................ 349/58 |
| 2006/0267863 | A1* | 11/2006 | Kim ............................. 345/51 |
| 2007/0115419 | A1* | 5/2007 | Song ........................... 349/150 |
| 2007/0273807 | A1* | 11/2007 | Yun ............................. 349/58 |
| 2008/0123016 | A1* | 5/2008 | Kwak et al. ................... 349/59 |
| 2009/0135329 | A1* | 5/2009 | Kim ............................. 349/58 |

FOREIGN PATENT DOCUMENTS

| CN | 1515940 A | 7/2004 |
| JP | 10-148819 | 6/1998 |
| JP | 2000-227604 A * | 8/2000 |
| JP | 2002-91325 A * | 3/2002 |
| JP | 2002-311418 | 10/2002 |

OTHER PUBLICATIONS

Chinese Office Action dated Mar. 27, 2009.
Chinese Office Action dated Jun. 22, 2010 with partial English translation thereof.

* cited by examiner

*Primary Examiner*—Mike Stahl
(74) *Attorney, Agent, or Firm*—McGinn IP Law Group, PLLC

(57) ABSTRACT

Disclosed is a liquid crystal display panel module. The liquid crystal display panel module includes a liquid crystal display panel in which a liquid crystal layer is sandwiched between a pair of substrates facing each other, a printed wiring board which is electrically connected to the liquid crystal display panel, a first frame-shaped chassis which is arranged in front of the liquid crystal display panel, and a second frame-shaped chassis which is electrically conductive and arranged behind of the liquid crystal display panel. In the liquid crystal display panel module, the liquid crystal display panel is held by the first chassis and the second chassis. And, the second chassis and a grounding electrode of the printed wiring board are electrically connected by attaching the printed wiring board to the second chassis.

27 Claims, 21 Drawing Sheets

LIQUID CRYSTAL PANEL MODULE AND LIQUID CRYSTAL DISPLAY DEVICE USING THE SAME

INCORPORATION BY REFERENCE

This application is based on Japanese Patent Application No. JP 2006-265693 filed on Sep. 28, 2006, and including a specification, claims, drawings and summary. The disclosure of the above Japanese Patent Application is incorporated herein by reference in its entirety.

BACKGROUND OF THE INVENTION

1. Field of the Invention

The present invention relates to a liquid crystal display (LCD) panel module which integrates various components such as an LCD panel, and an LCD device including the LCD panel module.

2. Description of the Related Art

An LCD device includes features of a thin shape, a light-weight, and low power consumption. Thus, an LCD device is widely used such as in office automation (OA) equipment, audio video (AV) equipment, portable terminal equipment or the like.

Generally, an LCD device includes a backlight, an optical member, an LCD panel, and a chassis for holding and attaching these members as main components in a broad sense.

More specifically, the backlight includes a plurality of parts, such as a lamp, a base for supporting the lamp, a reflecting plate and the like. The optical member includes a plurality of parts, such as a diffusing plate, an optical sheet and the like, which adjust a light of the backlight to be a uniform illumination light. A liquid crystal (LC) layer is sandwiched between two opposing substrates in the LCD panel.

As above described, the LCD device includes many parts. Therefore, it is troublesome to treat the many parts in a manufacturing process. Then, a related art is proposed to combine a number of the parts and make several units in order to decrease the number of the parts to be treated in the manu-facturing process of a liquid crystal display.

FIG. 20 is an exploded view of a backlight unit of an LCD device, as a related art. In FIG. 20, parts such as a lamp 95, a lamp support base 94, and a reflecting plate 96, constitute so-called a backlight. Further the backlight, a diffusing plate 93, an optical sheet 92 and a backlight chassis 91 for fixing the above-mentioned parts constitute a backlight unit 90.

FIG. 19 is a perspective view showing a configuration of an LCD device as a related art. The LCD device shown in FIG. 19 includes an LCD panel 80, the backlight unit 90 to which is referred in FIG. 20, and a front chassis 70 for attaching the LCD panel 80 and the backlight unit 90. Here, a printed wiring board 81 is connected to an edge part of the LCD panel 80 via a TCP (Tape Carrier Package) 82.

In the LCD device having such structures, the number of the parts to be treated in a manufacturing process may be reduced. Japanese Patent Application Laid-Open No. 2002-311418 discloses such LCD device.

An LCD panel requires a driver integrated circuit (IC) which drives the LCD panel, and circuit elements such as a printed wiring board which perform signal processing. Generally, as a structure that mounts circuit elements in the LCD panel, Chip On Glass (COG), Chip On Board (COB), Tape Carrier Package (TCP) and Chip On Film (COF) are known.

More specifically, in COG and COB, the circuit elements are directly mounted on a substrate of the LCD panel. On the other hand, in TCP and COF, circuit elements are connected to the substrate using wiring lines in a flexible film (hereafter, flexible substrate). However, in the LCD device, a width of an edge portion (rim) in a screen of an LCD panel (i.e. a width of a front chassis frame) is generally required to be narrow.

As a related art, FIG. 21 is a perspective view showing a configuration of an LCD device disclosed by Japanese Patent Application Laid-Open No. 1998-148819. Generally, when circuit elements are connected by using a TCP or a COF, a structure as shown in FIG. 21 is utilized. More specifically, in FIG. 21, a flexible substrate 3 is extended along a side of an LCD device and is connected to a printed wiring board 5 arranged on a rear side of a backlight unit (refer to pages 5-6 and FIG. 4 of Japanese Patent Application Laid-Open No. 1998-148819). Further, in FIG. 21, a liquid crystal cell 1, a frame 2 and integrated circuits 7 are housed in a bezel 11.

However, the LCD device in which the LCD panel and the backlight unit above-mentioned are separated have some difficulties described below.

That is, in the LCD device mentioned above, the LCD panel is placed on the backlight unit. A printed wiring board connected to the LCD panel is usually mounted, by using screws or the like, on a rear face of the backlight unit. In the LCD device having such structure, when the LCD panel and circuit elements are transported and when repairing such as an exchange of a backlight unit or a lamp is performed, it is necessary to place the printed wiring board on the rear face of the backlight and perform grounding during assembling.

Therefore, in the LCD device having the structure mentioned above, following difficulties occur:

(1) a connection defect may occur due to a troublesome grounding work;

(2) damage of an LCD panel and/or a circuit board may occur due to an excessive load in a transportation or an assembling process;

(3) contamination or damage of an LCD panel may occur due to a dust in a transportation or an assembling process.

Hereinafter, the difficulties will be described in detail.

First, grounding of a printed wiring board is difficult. That is, an LCD device tends to be influenced by an external electromagnetic field. When an electromagnetic noise superposes on the printed wiring board, it causes defects such as a malfunction of the LCD device and an abnormal display thereof. Therefore, it is desirable that an electric potential of a grounding electrode of the printed wiring board is the same as that of various chassis such as the front chassis and the backlight chassis.

For this reason, the chassis (the front chassis 70 and the backlight chassis 91 in an example shown in FIG. 19 and FIG. 20) outside the LCD device and a printed wiring board has to be electrically connected for a stable grounding.

Accordingly, after the printed wiring board is fixed on the rear face of the backlight unit, a grounding terminal of the printed wiring board is connected to a chassis of the backlight unit with a wiring.

In addition, the work for grounding of the printed wiring board is generally performed during assembling processes. After the printed wiring board is disconnected during exchange of a lamp installed in the backlight unit, an assembling operator or a maintenance engineer have to restore the grounding of the printed wiring board. As a result, an assembly process and a maintenance work become troublesome in connecting configuration above-mentioned. When the work for grounding is carelessly incomplete, an electromagnetic noise cannot be blocked off certainly.

Secondly, the circuit elements such as a driver IC, a flexible substrate and a printed wiring board, and an LCD panel tend to be damaged. That is, in the above-mentioned TCP and COF, an LCD panel is frequently transported as a part of the LCD device and at the time, the circuit elements arranged around the LCD panel is not amounted thereto during transportation. Therefore, since the circuit elements touch other members during transportation, excessive load may be applied on the circuit elements or the members.

A lamp for a backlight unit is a part with the shortest life-span in parts included in an LCD device. Thus, while the LCD device is working, the lamp may be exchanged. When a lamp is taken out of the backlight unit for an exchange thereof, a printed wiring board fixed on the rear face of the backlight unit is disconnected and, an LCD panel and a backlight are separated. After that, in order to exchange the lamp, the backlight unit has to be taken apart. After an exchange of the lamp, the backlight unit and the LCD panel are combined again, and then the printed wiring board is fixed on the rear face of the backlight unit. During the exchange work, the circuit elements may receive excessive load from handling by an assembly operator and a maintenance engineer and may be damaged.

In the above-mentioned case, the LCD panel by itself is transported in a factory process and between factories. Thus, the interference (i.e. contact) with other members in the LCD panel during transportation may cause damage, bend or the like in the LCD panel. In particular, when the size of LCD panel is larger, a weight and the interference thereof increase. Since transformation and/or distortion tend to occur during transportation of such large LCD panel, the risk of damage such as a warp and a breakage therein may be increased. When an LCD panel and a backlight unit are assembled in a destination for final assembly, damages may be given to the LCD panel.

Thirdly, an LCD panel may be contaminated by dusts, and an exposed surface thereof may get damaged.

That is, an LCD panel itself is usually manufactured in a clean environment, a so-called clean room. However, even if the LCD panel is manufactured by the clean environment, during transportation for LCD device assembly, assembly of a backlight unit or, lamp exchange work, dusts may adhere on the LCD panel. In such case, an operator may damage the LCD panel by mistake.

In an LCD device, various kinds of light sources, such as a cold cathode fluorescent lamp (hereinafter, referred to as "CCFL"), an external electrode fluorescent lamp (hereinafter, referred to as "EEFL") a light-emitting diode (hereinafter, referred to as "LED") or the like are available for a backlight. It is desirable for manufacturers who are supplied an LCD panels to be able to choose a desired kind of backlight in accordance with their several use. An LCD panel module and an LCD device in which a backlight can be readily exchanged are desired under such background.

SUMMARY OF THE INVENTION

The present invention was made to solve the foregoing and other exemplary problems, drawbacks, and disadvantages.

A first exemplary aspect of the present invention is to provide an LCD panel module in which a printed wiring board can be easily grounded, an LCD device including the LCD panel module.

According to the first exemplary aspect of the present invention, there is provided with a liquid crystal display (LCD) panel module which includes a liquid crystal display panel in which a liquid crystal layer is sandwiched between a pair of substrates facing each other, a printed wiring board which is electrically connected to the liquid crystal display panel, a first frame-shaped chassis which is arranged in front of the liquid crystal display panel and a second frame-shaped chassis which is electrically conductive and arranged behind of the liquid crystal display panel. In the liquid crystal display panel module, the liquid crystal display panel is held by the first chassis and the second chassis. And, the second chassis and a grounding electrode of the printed wiring board are electrically connected by attaching the printed wiring board to the second chassis.

According to the present invention, the grounding of a printed wiring board can be performed easily. That is, according to the present invention, the printed wiring board is attached on a second chassis and a grounding electrode of the printed wiring board is electrically connected to the second chassis. As a result, for example, a manufacturer who is supplied an LCD panel or an operator who is in charge of a last assembly step of the LCD device can conduct grounding of the printed wiring board easily.

A second exemplary aspect of the present invention is to provide an LCD panel module in which a printed wiring board can be easily grounded and also damage of circuit elements and an LCD panel can be prevented, and an LCD device including the LCD panel module.

In the second exemplary aspect of the present invention, the liquid crystal display panel module further includes at least one of an optical sheet and a diffusing plate for homogenizing a light which illuminates a rear side of the liquid crystal display panel. In the liquid crystal display panel module, at least one of the optical sheet and the diffusing plate is placed on the rear side of the liquid crystal display panel, and is held by the first chassis and the second chassis together with the liquid crystal display panel.

According to the present invention, grounding of the printed wiring board can be performed easily and damage of the circuit elements and the LCD panel can be prevented.

That is, in the present invention, a liquid crystal display panel, a printed wiring board, a first chassis, a second chassis and at least one of an optical sheet and a diffusing plate are integrated into one module. And, according to the integrated module, due to increase of stiffness, transformation and a warp of the LCD panel can be suppressed. Also, according to the integrated module, damage to the printed wiring board which may be produced by an operator can be excluded.

And, a third exemplary aspect of the present invention is to provide an LCD panel module in which grounding of a printed wiring board can be easily performed, and contamination or a scratch due to dust adhered to an LCD panel are prevented, and an LCD device including the LCD panel module.

According to the third exemplary aspect of the present invention, there is provided with a liquid crystal display panel module which includes a liquid crystal display panel in which a liquid crystal layer is sandwiched between a pair of substrates facing each other, a printed wiring board which is electrically connected to the liquid crystal display panel, a first frame-shaped chassis which is arranged in front of the liquid crystal display panel, a second frame-shaped chassis which is arranged behind of the liquid crystal display panel and is electrically conductive, a third frame-shaped chassis which is arranged between the first chassis and the second chassis and at least one of an optical sheet and a diffusing plate for homogenizing a light which illuminates a rear side of the liquid crystal display panel. In the liquid crystal display panel module, the liquid crystal display panel is held by the first chassis and the third chassis. At least one of the optical sheet and the diffusing plate is held by the second chassis and the third chassis. And, a grounding electrode of the printed wiring board and the second chassis are electrically connected by attaching the printed wiring board to the second chassis.

According to the present invention, grounding of a printed wiring board can be easily performed and contamination and a scratch on an LCD panel are prevented.

Generally, when an LCD panel is transported by itself, strict packing and careful conveyance are needed in order to prevent dust adhesion to the LCD panel and damage thereto. Further at a manufacturing process, the LCD panel and a backlight have to be carefully assembled so as not to adhere to dust and make a scratch. In contrast, in the present invention, at least one of optical sheets and diffusing plates is built in an LCD panel module. As a result, according to the present invention, without using a special protective member, a rear face of the LCD panel can be protected by the optical sheet and the diffusing plate. A configuration for easy grounding of a printed wiring board in the third exemplary feature is almost the same as the second exemplary feature.

Other exemplary features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Exemplary embodiments of the present invention will now be described in detail in accordance with the accompanying drawings.

The First Exemplary Embodiment

A liquid crystal display (LCD) panel module and an LCD device having the LCD panel module according to a first exemplary embodiment of the present invention will be described with reference to FIGS. 1 to 15 herein below.

Figure 1:
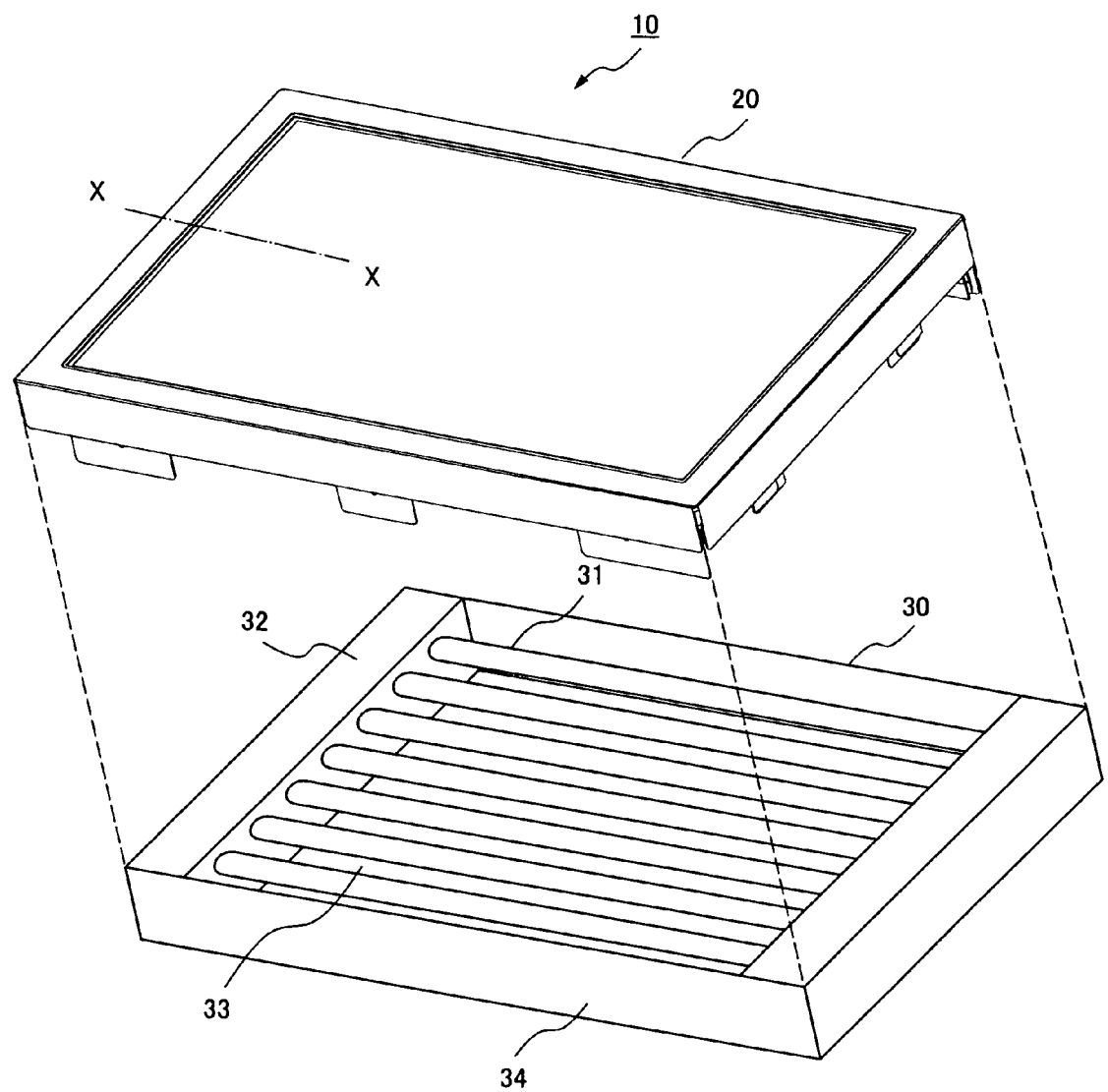
FIG. 1 is a perspective view showing an appearance of an LCD panel module and a backlight which constitute an LCD device according to a first exemplary embodiment of the present invention.

FIG. 1 is a perspective view showing an appearance of an LCD panel module and a backlight which constitute an LCD device according to a first exemplary embodiment of the present invention.

As shown in FIG. 1, an LCD device 10 according to the first exemplary embodiment includes an LCD panel module 20 and a backlight 30.

More specifically, the LCD panel module 20 includes a configuration in which a plurality of members including an LCD panel 22 are integrated into one module. Here, the LCD panel includes members described below:

a first substrate in which a switching element such as a thin film transistor is formed;

a second substrate opposing to the first substrate; and a liquid crystal (liquid crystal material) arranged between the two (first and second) substrates.

The backlight 30 includes a lamp (light source) 31, a lamp support base 32, a reflective sheet 33 and a backlight chassis 34. Further, a backlight 30 may be called the backlight unit 30.

Figure 2:
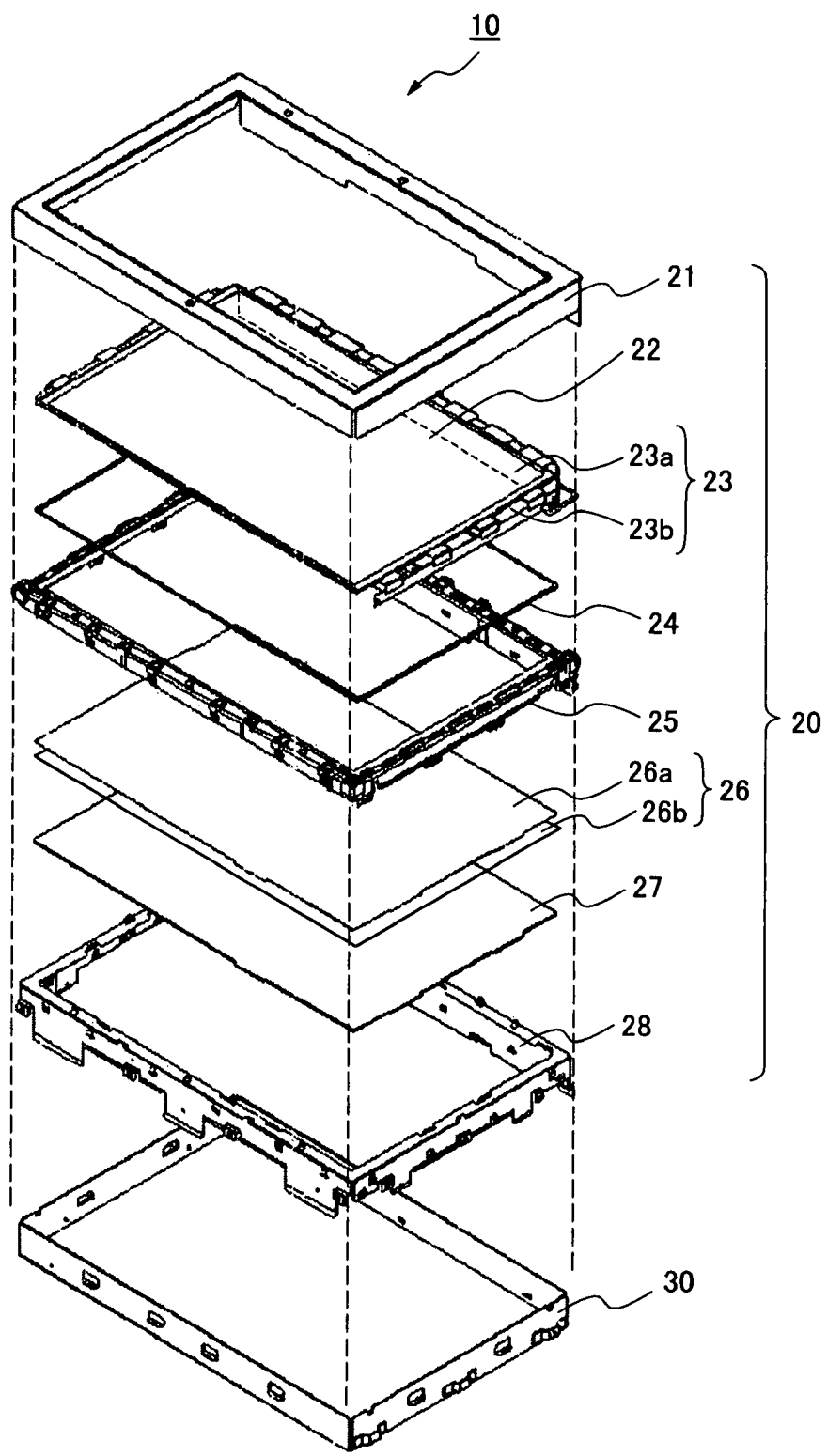
FIG. 2 is an exploded perspective view showing the LCD panel module of the LCD device according to the first exemplary embodiment of the present invention.
Figure 3:
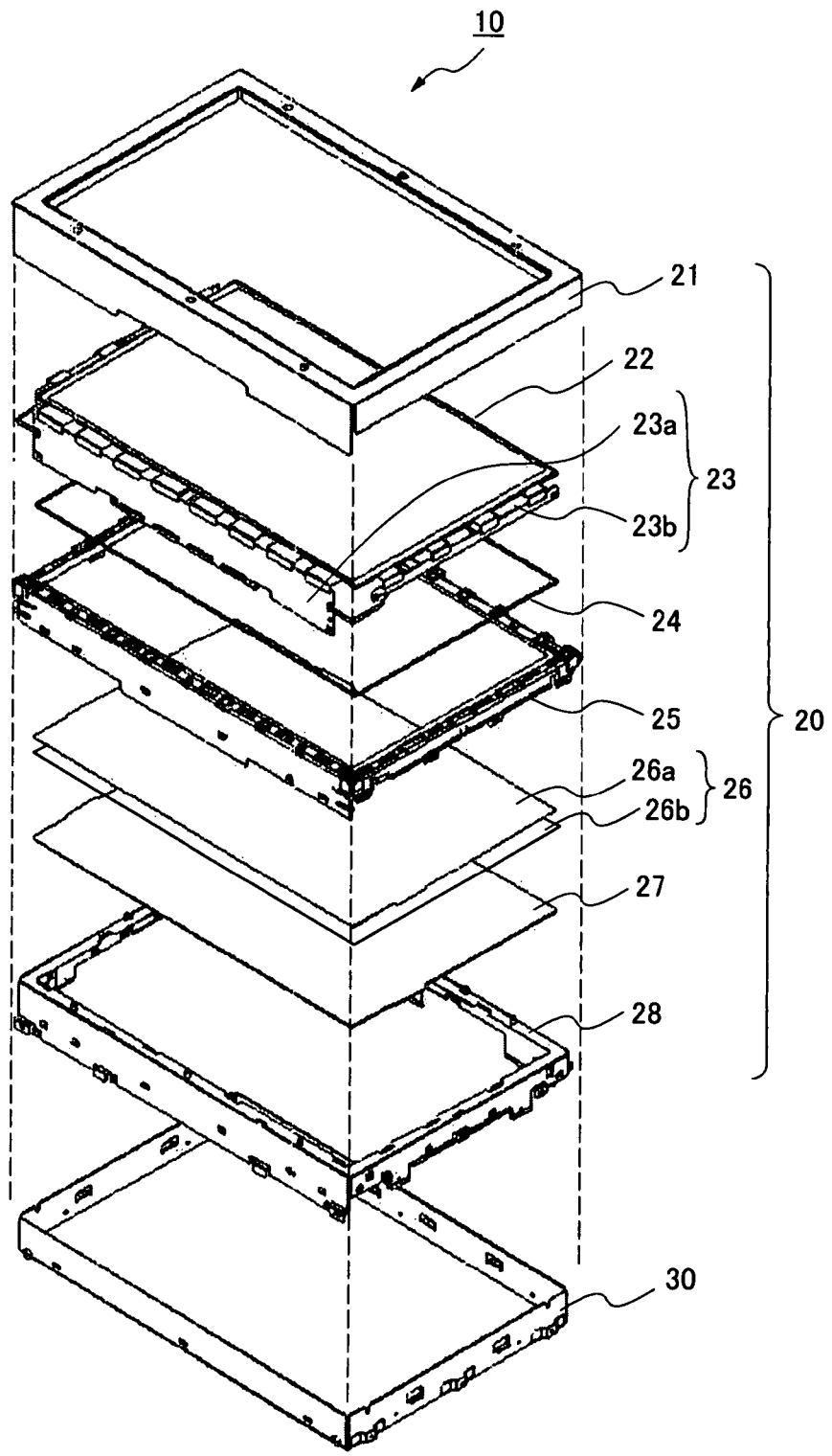
FIG. 3 is an exploded perspective view showing the LCD panel module of the LCD device according to the first exemplary embodiment of the present invention.

FIGS. 2 and 3 are exploded views of the LCD panel module according to the first exemplary embodiment of the LCD device of the present invention.

More specifically, FIG. 2 is a perspective view in a one direction of an exploded view of the LCD panel module 20 shown in FIG. 1. On the other hand, FIG. 3 is another perspective view in an opposite direction of the exploded view thereof shown in FIG. 1.

As shown in FIG. 2 and FIG. 3, the LCD panel module 20 includes members described below:

a frame-like chassis as a first frame-shaped chassis including a conductive material made of aluminum (Al) or the like arranged in a display side of the LCD device 10 (hereinafter, referred to as "front chassis 21")

the LCD panel 22 mentioned above;

a TCP or a COF on which a driver IC for driving the LCD panel 22 is mounted, and which connects to terminals formed on an edge of one substrate (usually, TFT substrate) in the LCD panel 22;

printed wiring board 23 which includes a signal processing circuit or the like, and which connects to edge terminals of the TCP or the COF;

a frame-like chassis formed of an insulating member such as a resin (hereinafter, referred to as "resin chassis 25") on which LCD panel 22 is placed;

a spacer 24 formed of a silicone rubber;

an optical sheet 26 including a polarized light sheet 26A and a diffusion sheet 26B;

a diffusing plate 27 for diffusing a light illuminated from the backlight 30; and a center chassis 28 as a second frame-shaped chassis formed of an electrically conductive member such as a metal.

Here, the center chassis 28 is a frame-like chassis formed of the conductive material such as aluminum (Al) or the like. The center chassis 28 engages with the resin chassis 25 to sandwich the optical sheet 26 and the diffusing plate 27 therebetween. Moreover, the center chassis 28 engages with the front chassis 21 to sandwich the LCD panel 22 therebetween.

The wiring board 23 includes a wiring board 23a connected to one side of two long sides of the LCD panel 22, and wiring boards 23b connected to two short sides thereof in the exemplary embodiment.

In this embodiment, expression of the "long side" and the "short side" which constitute an outside shape of the LCD panel 22 is described for descriptive purpose. Therefore, the liquid crystal panel 22 may include an outside shape with reverse positional relationship of the long side and the short side shown in FIGS. 2 and 3, or an outside shape with four sides each having an equal length.

In the exemplary embodiment, the printed wiring board 23a and the printed wiring boards 23b are attached (mounted) on the center chassis 28 respectively. In the attached state, a grounding electrode of the each printed wiring board is connected to the center chassis 28 electrically.

Further, a configuration of the LCD panel module 20 described with reference to FIG. 2 and FIG. 3 is one of examples. Accordingly, the LCD panel module according to the exemplary embodiment may be configured by a following configuration:

removing a spacer 24;

an optical sheet 26 composed of three or more optical members;

removing an optical sheet 26;

a configuration in which a printed wiring board 23b is arranged on one of two short sides of an LCD panel; or a configuration in which a couple of wiring boards 23a are arranged on two long sides of an LCD panel.

In the exemplary embodiment, the front chassis 21 is formed of an electrically conductive material. However, if not necessary to make electrical connection between the front chassis 21 and the center chassis 28, it is not necessary to adopt a conductive material as the whole front chassis 21, and a conductive material may constitute only a part thereof.

In the exemplary embodiment, the resin chassis 25 is composed of an insulating material. However, if not necessary to secure insulation of a part keeping in contact with the liquid crystal panel 22, the wiring board 23, and the like, it is not necessary to adopt an insulating material as the whole resin chassis 25, and only a part thereof may be constituted by an insulating material.

Further, in the exemplary embodiment, the center chassis 28 may include at least a conductive part which electrically connects with the printed wiring board 23, the front chassis 21, the backlight chassis 34 and an external device. Generally, it is desirable to form the center chassis 28 using an electrically insulating material such as a resin for reducing the weight and, in this case, to employ a configuration in which a metallic foil as a conductive member is arranged at parts of front and rear faces thereof.

Next, a detailed structure of the LCD panel module 20 will be described with reference to FIG. 4.

Figure 4:
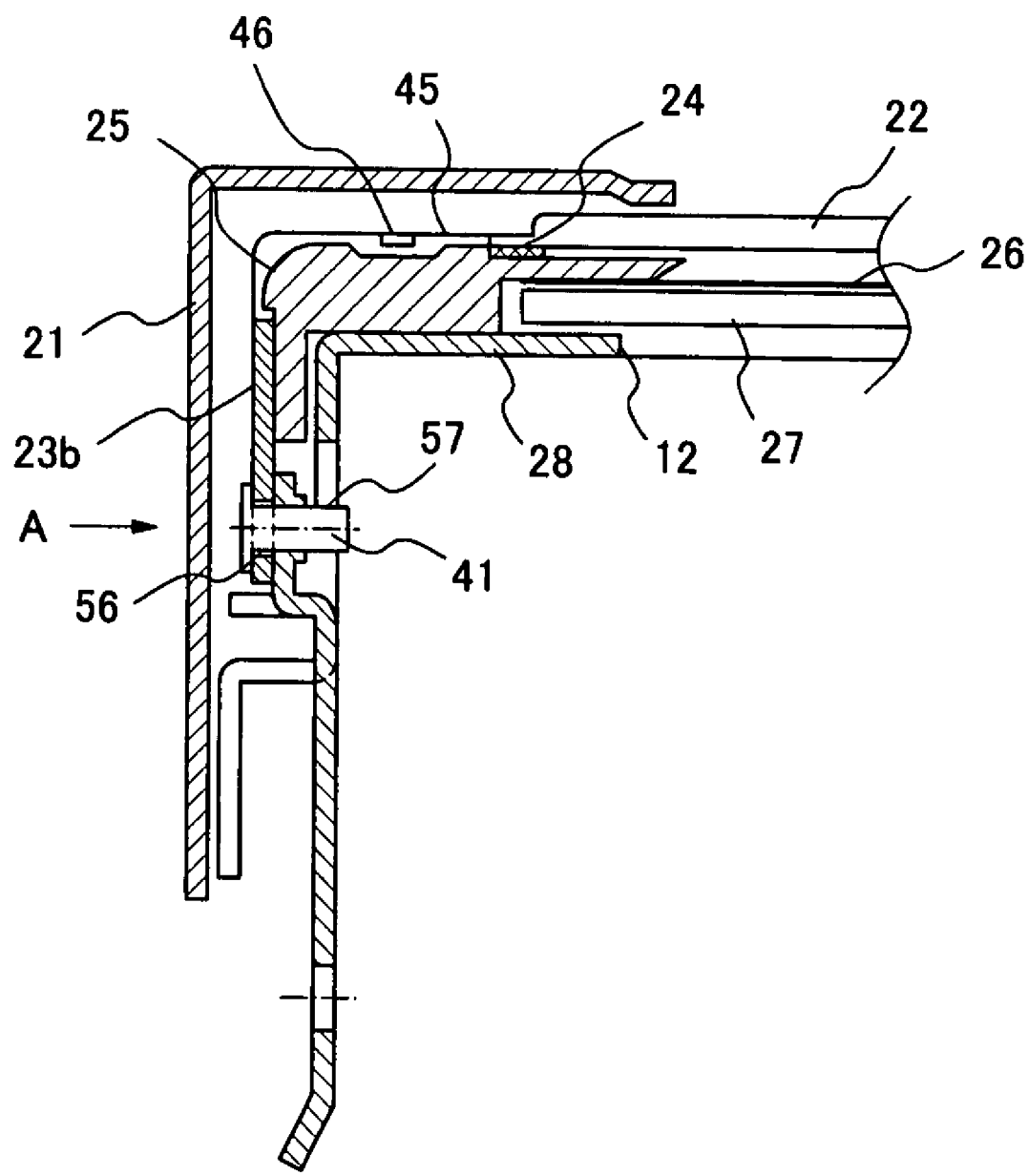
FIG. 4 is a fragmentary sectional view showing a structure of the LCD panel module according to the first exemplary embodiment of the present invention.

FIG. 4 is a fragmentary sectional view showing a structure of the LCD panel module according to the first exemplary embodiment of the present invention, and this fragmentary sectional view shows a shape of the cross-section of the LCD panel module 20 taken along an X-X line shown in FIG. 1.

As shown in FIG. 4, at least one of edge portions of a flat plate (at least a side where the wiring board 23 is arranged) is bended at a substantially right angle in order to form the center chassis 28. An upper face of the center chassis 28 includes an opening through which a light from a backlight 30 illuminates an LCD panel 22.

The diffusing plate 27 and the optical sheet 26 are installed so as to touch the upper face of the center chassis 28 and cover the opening 12. As shown in FIG. 4, the diffusing plate 27 is arranged on the upper face of the center chassis 28, and the optical sheet 26 is arranged on the diffusing plate 28. The diffusing plate 27 and the optical sheet 26 are held by the resin chassis 25 arranged so that an edge portion of the center chassis 28 may be covered thereby, and are fixed to cover the opening 12 of the center chassis 28. That is, the resin chassis 25 is formed on a part of the upper face of center chassis 28, and a part of a side part thereof as well, in the exemplary embodiment.

Further, the LCD panel 22 is placed on an upper surface of the resin chassis 25 via a spacer 24. As shown in FIG. 2 and FIG. 3, an overall shape of the spacer 24 is a rectangular.

As shown in FIG. 4, a TCP 45 is a kind of a flexible substrate, and mounts an IC chip 46 such as a driver integrated circuit for driving the LCD panel 22 and various circuit elements (not shown) thereon. An end of the TCP 45 connects to the LCD panel 22. The TCP 45 is a wiring member with a flexible film (i.e. flexible substrate). Further, since the TCP 45 can be bent along a lateral surface of the resin chassis 25, another end of the TCP 45 connects to the printed wiring board 23 arranged at a side face of the resin chassis 25. In the cross sectional view shown in FIG. 4, as the printed wiring board 23, a cross sectional view of the printed wiring board 23b is shown.

A COF can be adopted as the TCP 45. However, in the following description of the exemplary embodiment, examples using the TCP 45 are described for convenience.

A screw 41 which is used for attaching the printed wiring board 23 is inserted through a hole 56 (through-hole) provided in the wiring board 23b, and is screwed in a screw hole 57 provided in the center chassis 28.

Moreover, a front chassis 21 is arranged on a surface of the LCD panel 22. The front chassis 21 is mounted to a predetermined position of the center chassis 28.

Since an electronic circuit board is downsized by progress of recent circuit technology, the wiring board 23b can be arranged on the side face of the resin chassis 25.

As mentioned above with reference to FIG. 4, the wiring board 23b and the center chassis 28 are fixed with the fixing screw 41.

In the exemplary embodiment, a grounding electrode (GND) of the wiring board 23b and the center chassis 28 are electrically connected by attaching with the screw 41. Here, a more specified example of a configuration for making grounding is described with reference to FIG. 5A.

Figure 5A:
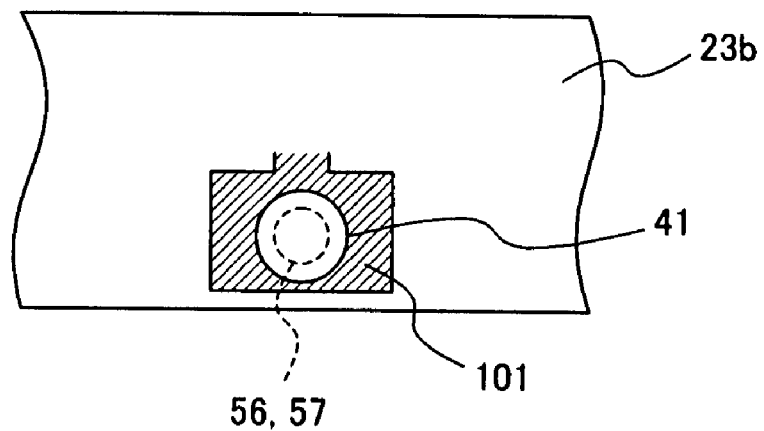
FIG. 5A is a side view showing an exemplified state where attaching and connection for grounding between a wiring board and a center chassis by screws are simultaneously performed, as a view typically showing a connection structure of the wiring board and center chassis according to the first exemplary embodiment of the present invention.

FIG. 5A is a view showing state where fixing and connection for grounding between a wiring board and a center chassis by screws are simultaneously performed according to the first exemplary embodiment of the present invention.

As shown in FIG. 5A, a hole 56 for inserting the fixing screw 41 is formed in a grounding region 101 of the printed wiring board 23b. In the exemplary embodiment, the screw 41 is inserted into the hole 56 and is screwed in the screw hole 57 formed in a center chassis 28. The center chassis 28 is formed of an electrically conductive material such as a metal. Accordingly, a grounding electrode (the grounding region 101) of the printed wiring board 23b and the center chassis 28 are connected electrically.

An electrically conductive material (e.g. a metal) may be adopted as the screw 41. However, in a case of the connection structure mentioned above with reference to FIG. 5A, the electrical connection between the grounding electrode of wiring board 23b and the center chassis 28 is secured irrespective of a material of the fixing screw 41.

In a configuration example shown in FIG. 5A, the printed wiring board 23b and the center chassis 28 are screwed by the screw 41. However, a fixing method of fixing the printed wiring board 23b and the center chassis 28 is not limited to a method using of the screw. More specifically, attaching (mounting) method using a fitting structure can also be adopted.

In the configuration example shown in FIG. 5A, by the screw 41, the attaching and the connection for grounding between the printed wiring board 23b and the center chassis 28 are conducted simultaneously. However, the method of the attaching (mounting) and the method of the connection for grounding above-mentioned are not limited to the configuration example shown in FIG. 5A. Here, another example is described with reference to FIG. 5B as a modification of the first exemplary embodiment.

Figure 5B:
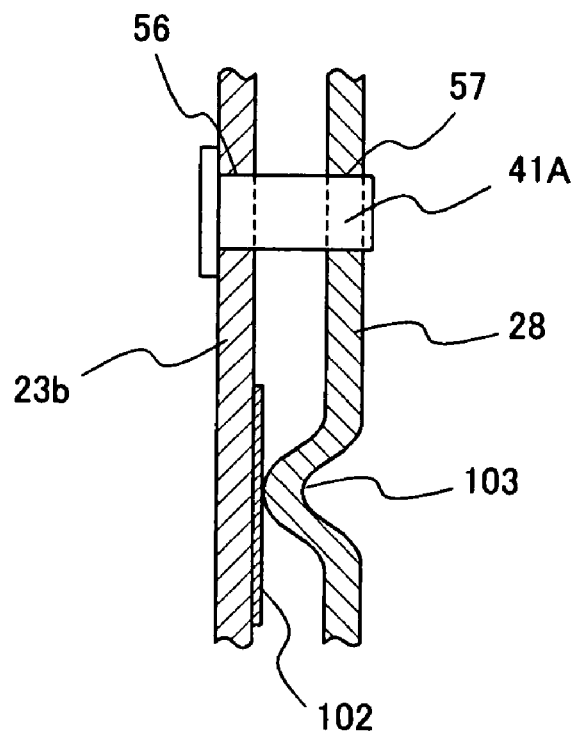
FIG. 5B is a sectional view showing an exemplified state where attaching and connection for grounding of a wiring board are individually performed, as a view typically showing a connection structure of the wiring board and the center chassis according to a modification of the first exemplary embodiment of the present invention.

FIG. 5B is a view showing a state where fixing and connection for grounding of a wiring board are individually performed according to a modification of the first exemplary embodiment of the present invention.

That is, fixing and grounding are performed in different parts in the configuration example shown in FIG. 5B. More specifically, in the modification, as shown in FIG. 5B, a grounding region 102 is provided on a side face of the center chassis 28 facing the wiring board 23b. On the other hand, a projecting portion 103 having elasticity is formed in a position of the center chassis 28 corresponding to the grounding region 102. The printed wiring board 23b and the center chassis 28 are fixed by a fixing screw 41A. Thereby, the grounding region 102 of the wiring board 23b electrically contacts the projecting portion 103 of the center chassis 28. In the modification, according to the electric contact between the grounding region 102 and the projecting portion 103, the grounding electrode of the printed wiring board 23b and the center chassis 28 can be connected electrically.

In the modification, since the grounding is performed as above-mentioned, unlike the configuration example shown in FIG. 5A, the screw 41A which is not electrically conductive may be employed.

Thus, as mentioned above with reference to FIG. 5A and FIG. 5B, according to the exemplary embodiment and the modification thereof, the attaching (mounting) and the connection for grounding between the printed wiring board 23b and the center chassis 28 can be performed.

Further, the structure of the fixing and the connection for grounding between the printed wiring board 23b and the center chassis 28 which are described with reference to FIG. 5A and FIG. 5B, is also applicable in a second and a third exemplary embodiments mentioned below.

Next, an assembling structure of a LCD panel module 20 and a backlight 30 will be described with reference to FIG. 6.

Figure 6:
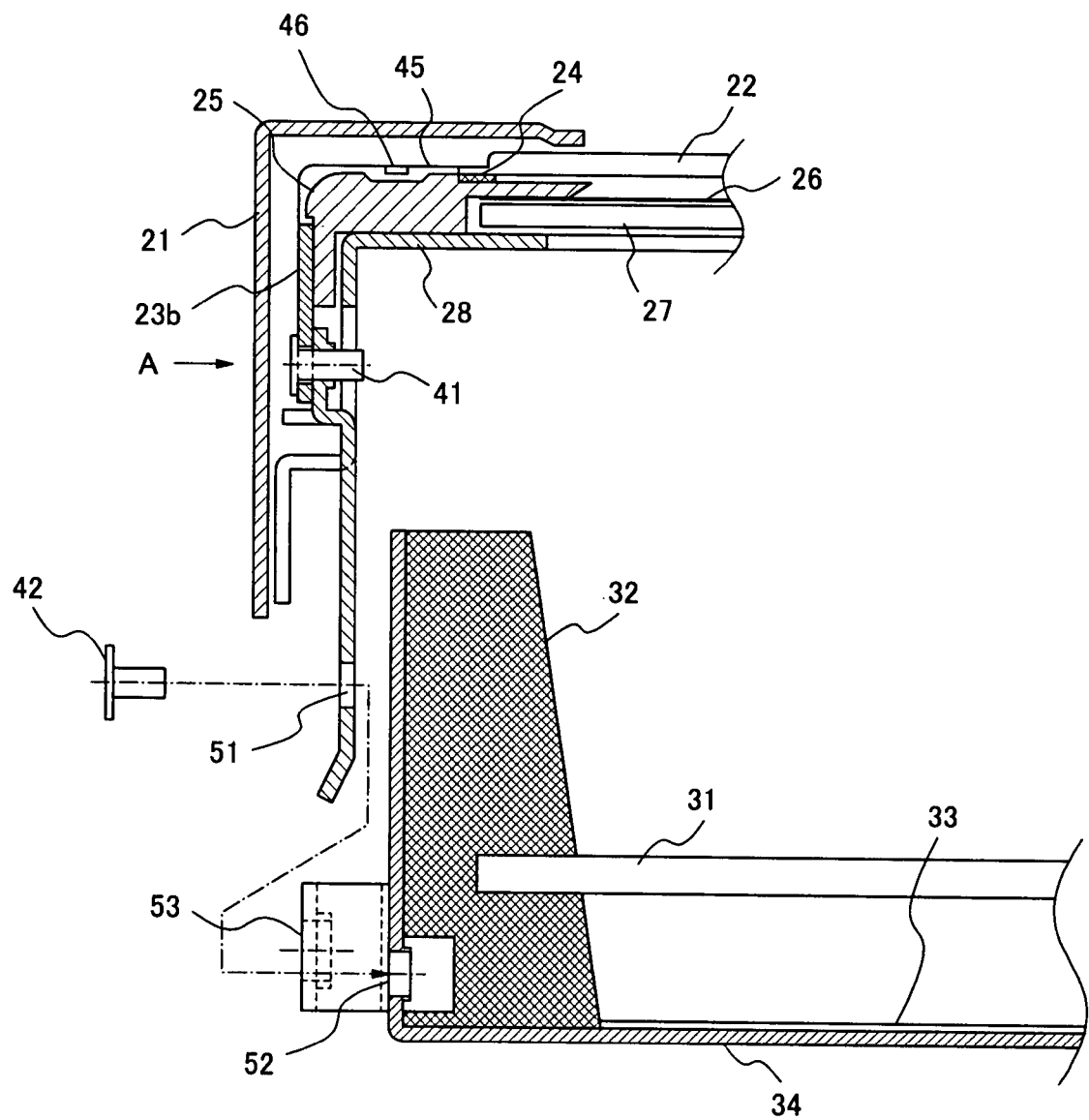
FIG. 6 is a cross sectional view showing a connection state between the LCD panel module and the backlight according to the first exemplary embodiment of the present invention.

FIG. 6 is a cross sectional view showing a connection state of the LCD panel module and the backlight according to the first exemplary embodiment of the present invention. The cross sectional view shows a cross-sectional view of the backlight unit 30 taken along the X-X line shown in FIG. 1 in addition to the fragmentary sectional view shown in FIG. 4.

As shown in FIG. 6, first, an internal surface of the center chassis 28 is fitted into an outer surface of the backlight chassis 34 which forms an outer shape of the backlight unit 30. Next, a screw 42 for fixing the center chassis 28 is inserted into a screw hole 51 formed in the center chassis 28. While the screw 42 is inserted into the screw hole 51, the screw 42 is screwed in a screw hole 52 formed in the backlight chassis 34. Thereby, the LCD panel module 20 and the backlight 30 are attached (mounted).

An electrically conductive material (e.g. a metal) may be used as a material for the screw 42. However, as mentioned above, the electrical conductive material such as metal is used for the center chassis 28 in the exemplary embodiment. On the other hand, the electrical conductive material such as metal is also used for the backlight chassis 34. As a result, irrespective of the material of the screw 42, the center chassis 28 physically contacts the backlight chassis 34 by attachment with the screw 42 to make an electrical connection therebetween.

A screw hole 53 is provided in a position, which is different from the position of the screw hole 52, on an outer surface of the backlight 30. In the exemplary embodiment, a screw (not shown) for fixing the LCD device 10 can be screwed in the screw hole 53. The LCD device 10 can be installed in an external device (not shown), such as an LCD monitor, using the screw hole 53. Thereby, the center chassis 28, the backlight 30 and the external device are integrated to be fixed. In the case, when an electrically conductive screw (e.g. metal screw) screws in the screw hole 53, the grounding electrode of the printed wiring board 23b is electrically connected to the center chassis 28, the backlight 30 and external equipment.

FIG. 6 shows that a screw for attaching an LCD device 10 to the external equipment is screwed in the screw hole 53 installed in a backlight 30. However, the attaching (mounting) method is not limited to the structure shown in FIG. 6.

Figure 7:
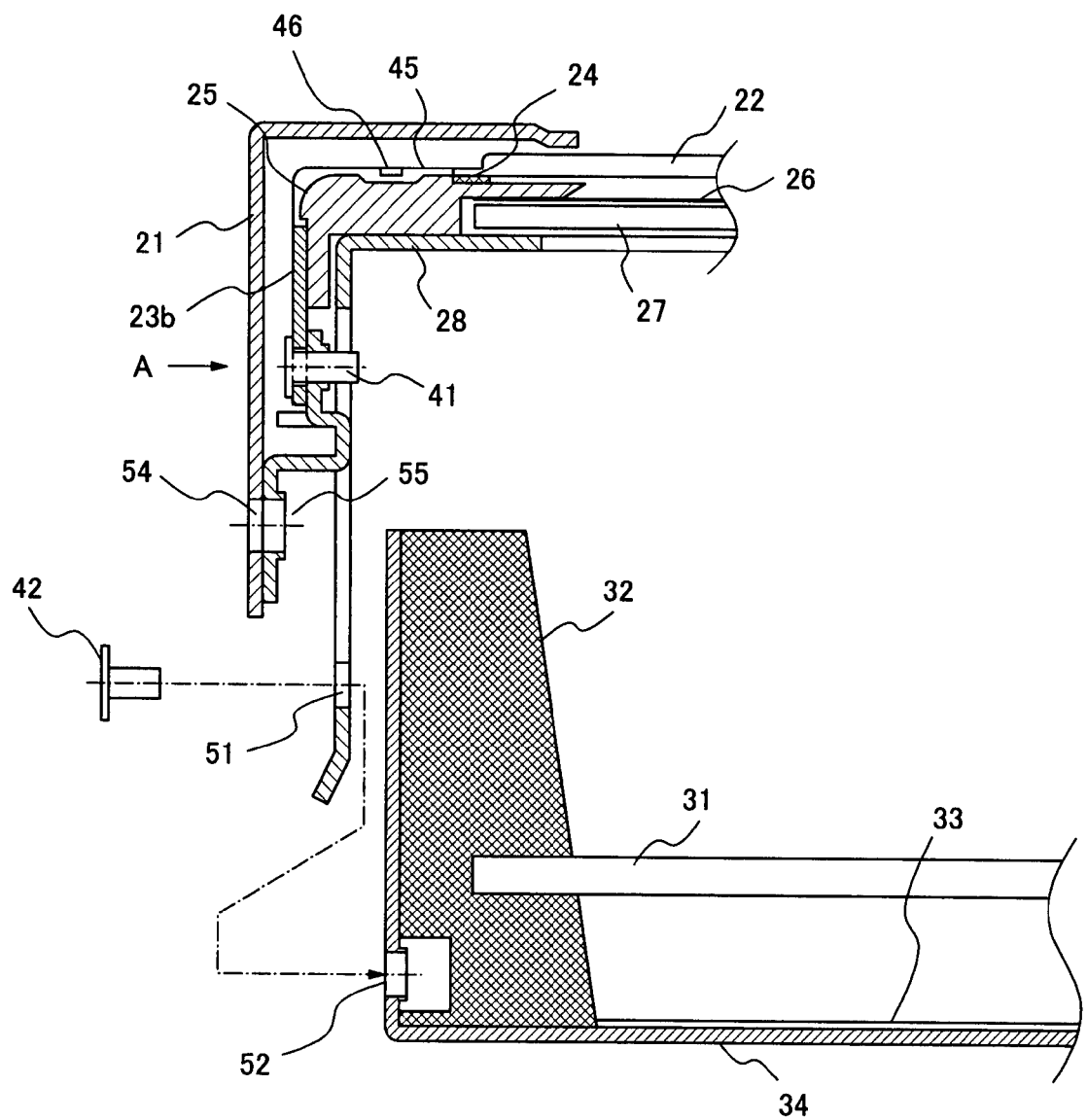
FIG. 7 is a cross sectional view showing connection between the LCD panel module and the backlight according to a modification of the first exemplary embodiment of the present invention.

FIG. 7 is a cross sectional view showing connection between the LCD panel module and the backlight according to a modification of the first exemplary embodiment of the present invention. The cross sectional view also shows the cross-sectional view of the backlight unit 30 (the backlight unit in the modification) taken along the X-X line shown in FIG. 1 in addition to the fragmentary sectional view shown in FIG. 4 like a case of FIG. 6.

In the modification shown in FIG. 7, a part in which the center chassis 28 and the backlight unit 30 are screwed together (the screw hole 52) is also used for fixing the LCD device 10 to the external device (not shown). In case of the structure according to the modification, the grounding electrode of the printed wiring board 23b can be connected to external equipment via the center chassis 28 and the front chassis 21, irrespective of a shape of the backlight 30 and a method for grounding.

Next, assembling processes of the LCD panel module 20 having the structure mentioned above will be described with reference to FIGS. 8 to 14.

FIGS. 8 to 11 and FIGS. 13A to 14 are perspective views showing the assembling processes of the LCD panel module according to the first exemplary embodiment of the present invention.

Figure 8:
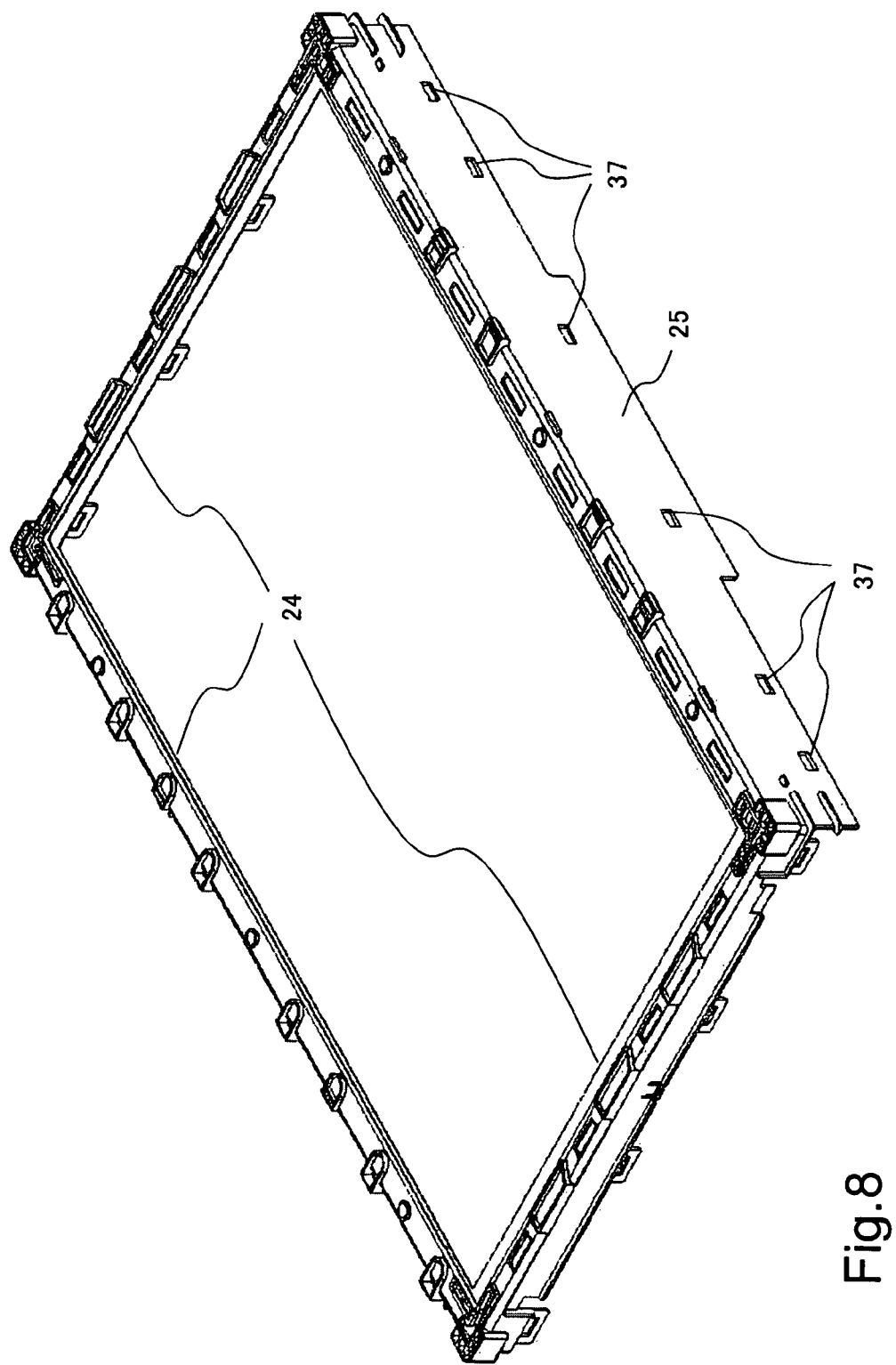
FIG. 8 is a perspective view showing a partially-assembled LCD panel module according to the first exemplary embodiment of the present invention.

First, as shown in FIG. 8, a spacer 24 is arranged along an opening formed in a top surface of a resin chassis 25. The spacer 24 includes the rectangular shape corresponding to a size of the opening as mentioned above with reference to FIG. 2 and FIG. 3.

Further, reference numbers 37 shown in FIG. 8 represent a plurality of holes for fitting mentioned below with reference to FIG. 12A and FIG. 12B.

Figure 9:
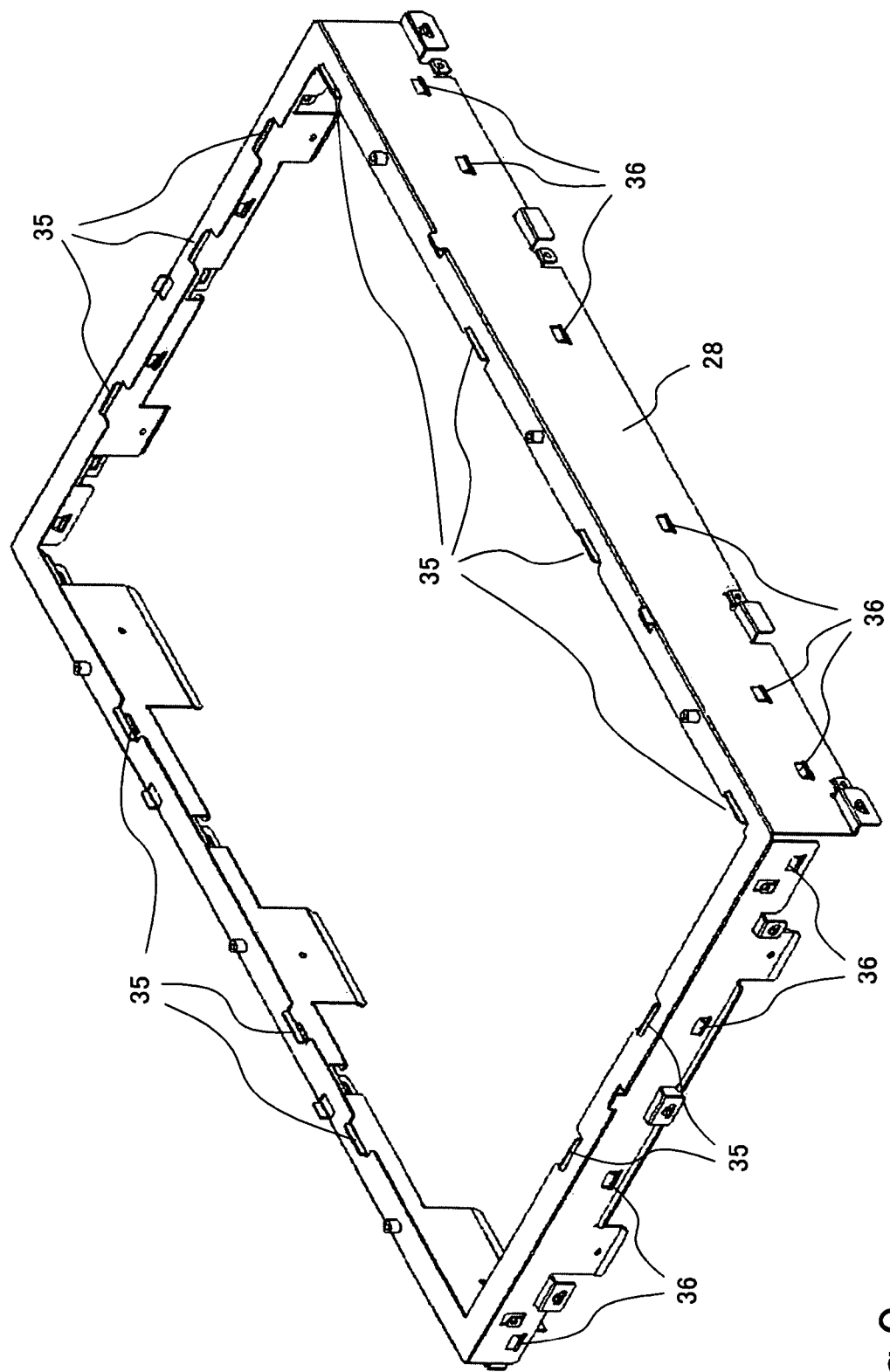
FIG. 9 is a perspective view showing a partially-assembled LCD panel module according to the first exemplary embodiment of the present invention.

Next, as shown in FIG. 9, a center chassis 28 is prepared. In the exemplary embodiment, the center chassis 28a includes a plurality of projections 35 which is formed by bended parts of a sheet metal which constitutes the center chassis 28.

Further, reference numbers 36 shown in FIG. 9 represent a plurality of projections for fitting mentioned later with reference to FIG. 12A and FIG. 12B.

Figure 10:
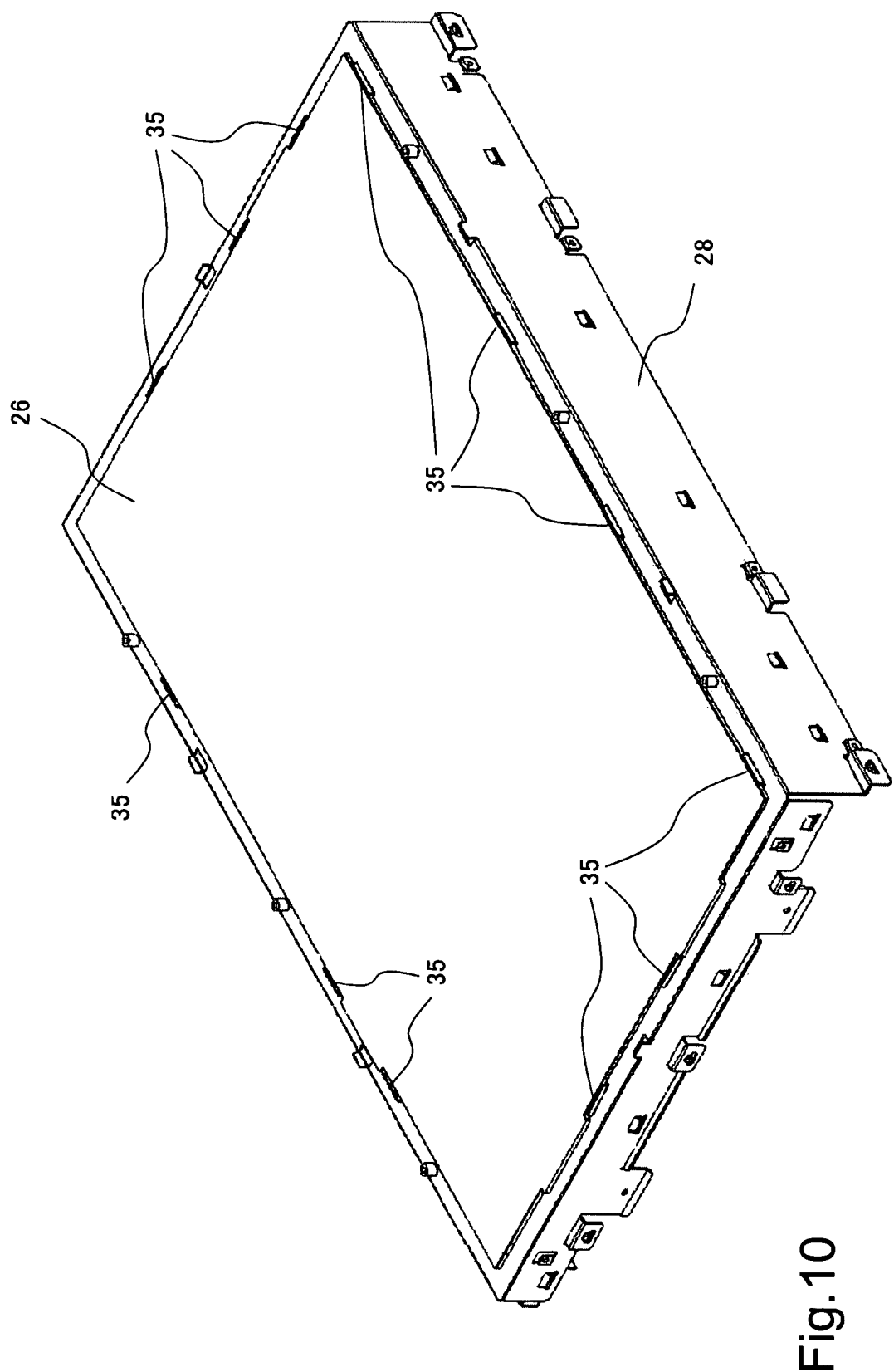
FIG. 10 is a perspective view showing a partially-assembled LCD panel module according to the first exemplary embodiment of the present invention.

A diffusing plate 27 is placed on an upper face of the center chassis 28 to cover an opening formed therein. Then, an optical sheet 26 is placed on the diffusing plate 27. When the optical sheet 26 are placed on the diffusing plate 27, convex portions and/or concave portions provided on the diffusing plate 27 and the optical sheet 26 are fitted to a plurality of projections 35 provided on the center chassis 28. The center chassis 28 on which the optical sheet 26 is placed is shown in FIG. 10.

Figure 11:
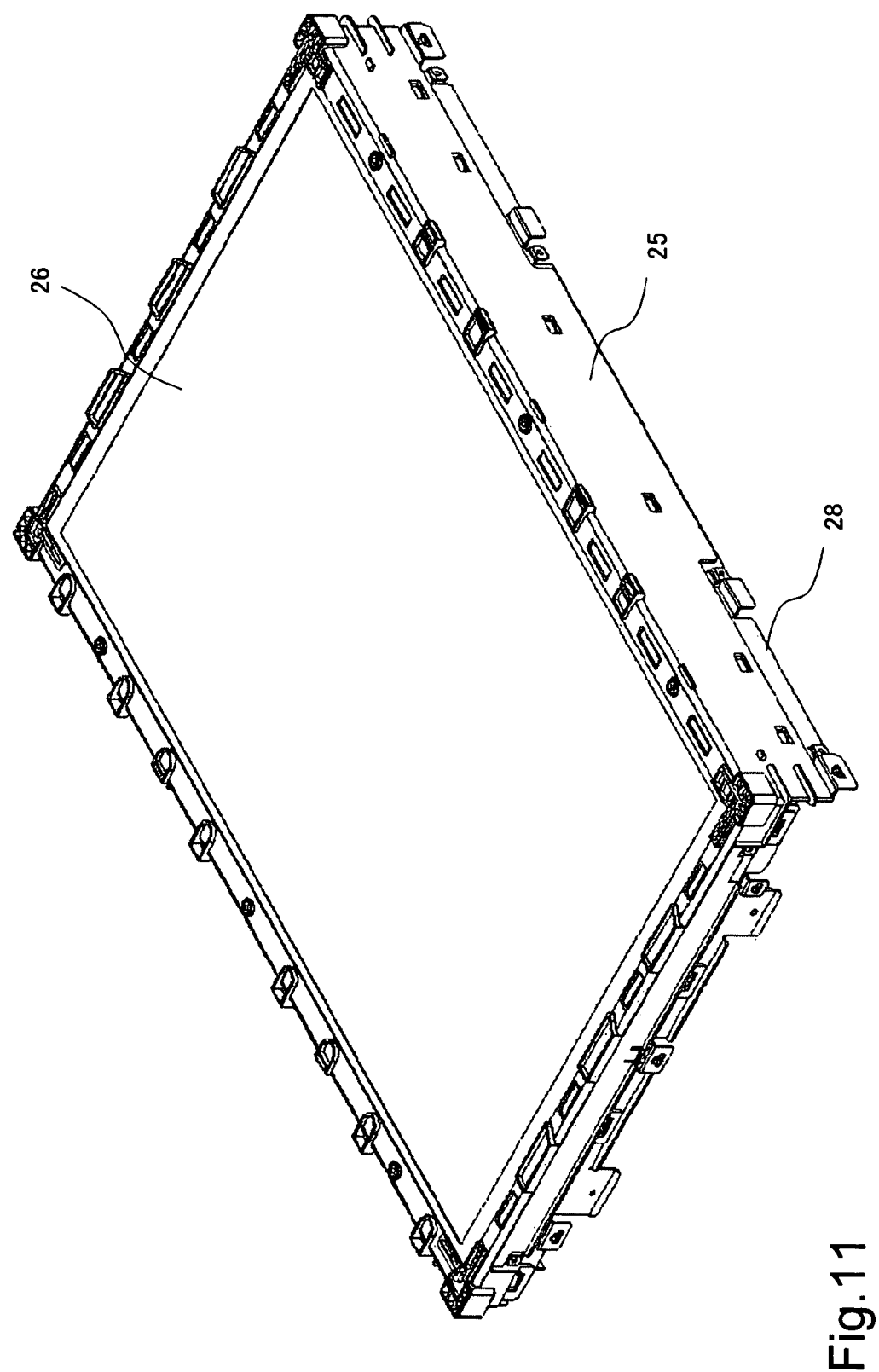
FIG. 11 is a perspective view showing a partially-assembled LCD panel module according to the first exemplary embodiment of the present invention.

Next, a resin chassis 25 (FIG. 8) having the spacer 24 is placed on the center chassis 28 (FIG. 10) on which the diffusing plate 27 and the optical sheet 26 are placed. Thereby, the resin chassis 25 fits the center chassis 28. This state is shown in FIG. 11.

The fitting structure including the resin chassis 25 and the center chassis 28 is not limited to the exemplary embodiment. Here, one example of fitting structures will be described below.

Figure 12A:
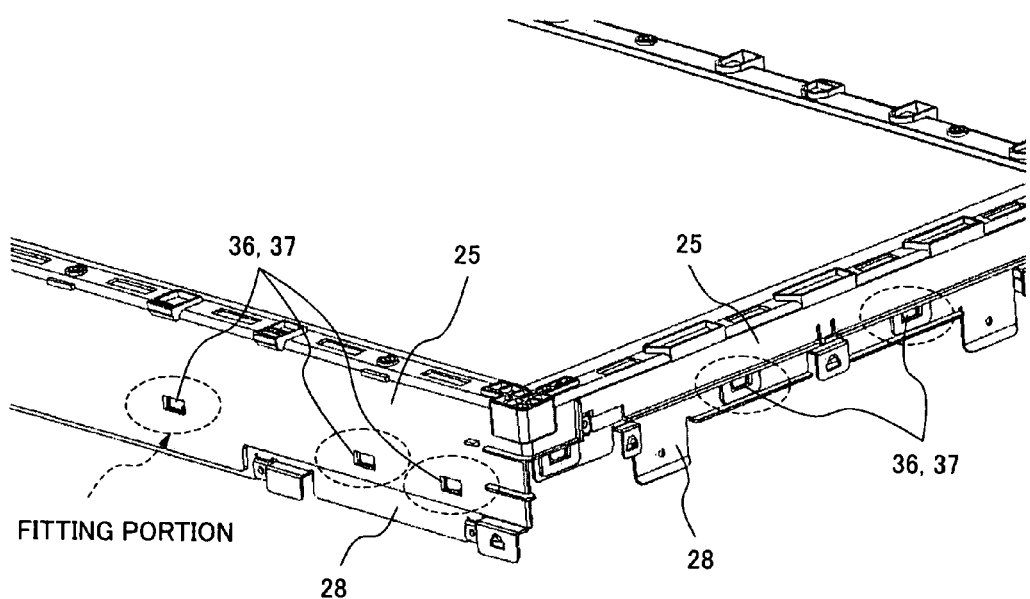
FIG. 12A is a perspective view showing a fitting state of a resin chassis and a center chassis according to the first exemplary embodiment of the present invention.
Figure 12B:
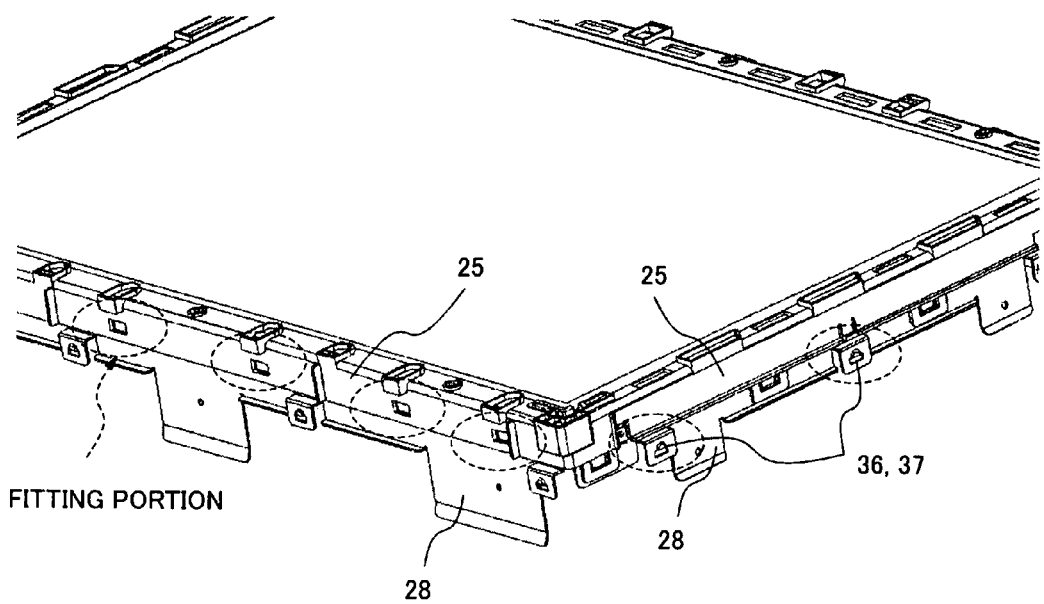
FIG. 12B is a perspective view showing a fitting state of a resin chassis and a center chassis according to the first exemplary embodiment of the present invention.

FIG. 12A and FIG. 12B are perspective views showing the fitting state of the resin chassis 25 and the center chassis 28 according to the first exemplary embodiment of the present invention. Further, FIG. 12B is a perspective view of the chassis in an opposite direction of FIG. 12A. For example, as shown in FIG. 12A and FIG. 12B, when a plurality of projections 36 provided on the center chassis 28 are fitted into a plurality of holes 37 provided in the resin chassis 25, the two chassis can be firmly coupled.

Next, a step of placing an LCD panel 22 on the resin chassis 25 fitted in the center chassis 28 as shown in FIG. 12A and FIG. 12B, will be described.

Figure 13A:
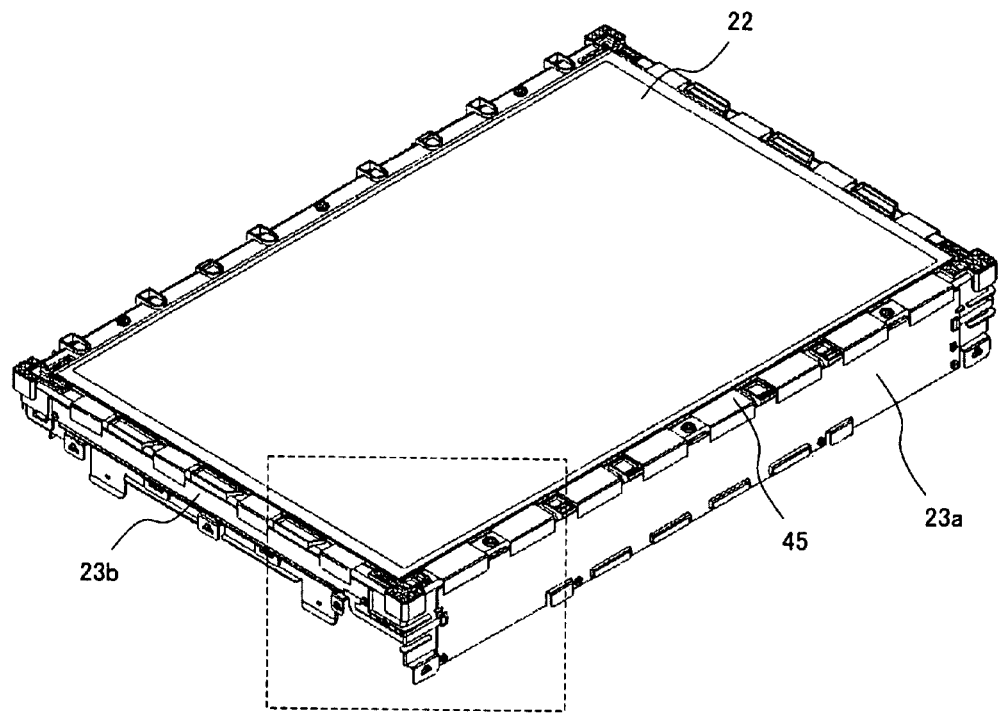
FIG. 13A is a perspective view showing a partially assembled LCD panel module according to the first exemplary embodiment of the present invention.
Figure 13B:
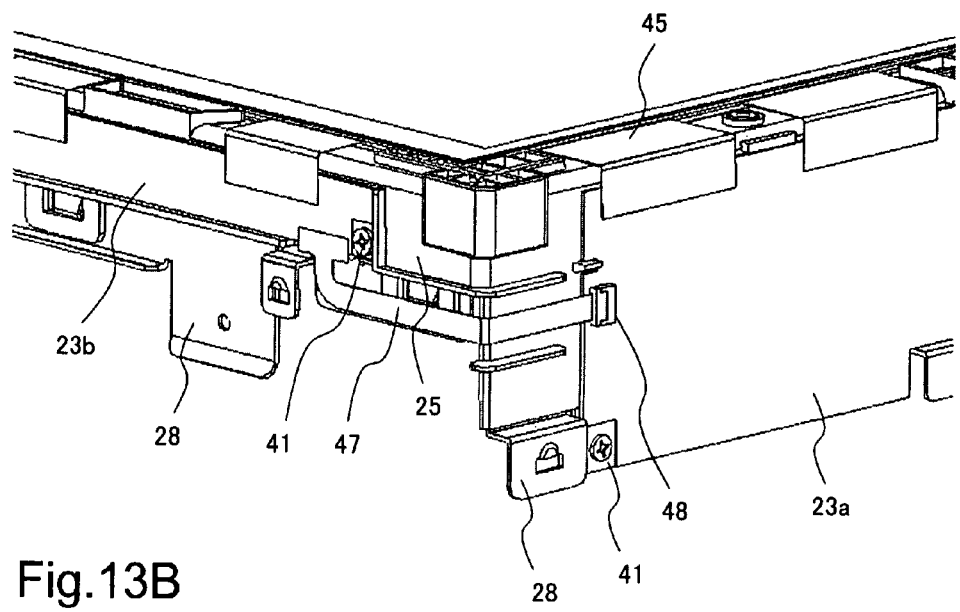
FIG. 13B is a partially enlarged view showing a rectangle part shown with a dashed line in the perspective view of FIG. 13A.

FIG. 13A is a perspective view illustrating an assembling process of an LCD panel module according to the first embodiment of the present invention. FIG. 13B is a detail enlarged view for a rectangle part shown with a dashed line in the perspective view of FIG. 13A.

As mentioned above with reference to FIG. 4 and another figures, in the exemplary embodiment, the LCD panel 22 and the printed wiring board 23 (23a and 23b) are connected via a TCP 45. Accordingly, in this process, as shown in FIG. 13A, the LCD panel 22 is placed on the resin chassis 25. While the LCD panel 22 is placed, the printed wiring board 23a or the printed wiring board 23b is arranged on a side face of the resin chassis 25 since the TCP 45 is flexible.

Next, as shown in FIG. 13B, fixing screws 41 are inserted in screw holes provided in the printed wiring boards 23a and 23b. When the screws 41 are screwed in the screw holes provided in the center chassis 28, the printed wiring boards 23a and 23b are mounted to the center chassis 28.

The attaching of the wiring board 23 with screws 41 are already described with reference to FIGS. 4, 5A, and 5B, as an example of fixing the printed wiring board 23b. That is, as mentioned above, a screw hole (the screw hole 56 provided in the grounding region 101 of the printed wiring board 23b in the example shown in FIG. 5A) is formed in each of grounding regions of the printed wiring boards 23a and 23b. In the exemplary embodiment, each grounding electrode of the printed wiring boards 23a and 23b electrically connects to the center chassis 28 via the screw 41 inserted in the screw hole.

Figure 14:
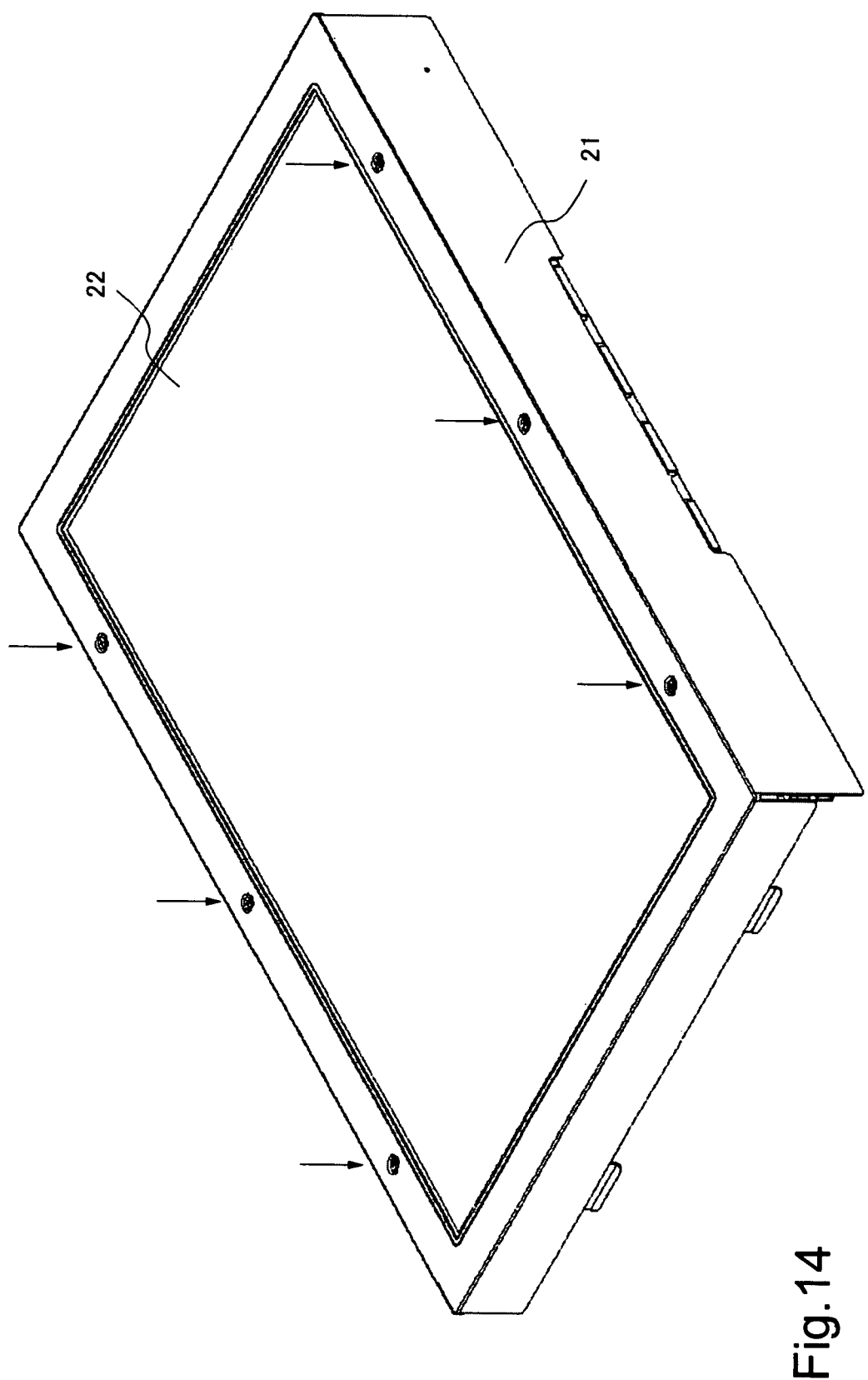
FIG. 14 is a perspective view showing a partially assembled LCD panel module according to the first exemplary embodiment of the present invention.

Moreover, as shown in FIG. 13B, a flexible cable 47 of the printed wiring board 23b is connected to a connector 48 of the printed wiring board 23a. Then, a front chassis 21 is put on the resin chassis 25 including the LCD panel 22 thereon. As shown in FIG. 14, the front chassis 21 is fixed to the resin chassis 25 by screwing. Thereby, the LCD panel module 20 which is an upper structure in FIG. 1 is completed. The LCD device 10 is completed when the LCD panel module 20 is combined with the backlight 30.

Thus, the LCD panel 22 is fixed by the front chassis 21 and the resin chassis 25 which constitute the LCD panel module 20 in the first exemplary embodiment. The optical sheet 26 and the diffusing 27 are fixed by the resin chassis 25 and the center chassis 28 in the LCD panel module 20.

Moreover, in the exemplary embodiment, the printed wiring board 23 (23a and 23b) is attached, by the screw 41, to the center chassis 28 as mentioned above with reference to FIGS. 4 and 5. The attaching structure (attaching method) in which the printed wiring board 23 and the center chassis 28 are attached by the screw 41 forms an electric connection between the grounding electrode of the printed wiring board 23 and the center chassis 28.

Accordingly, according to the exemplary embodiment, damage to the LCD panel 22 and the printed wiring board 23 in an assembly process or transporting process can be prevented. Moreover, when the attaching (mounting) structure mentioned above is employed, the grounding of the printed wiring boards 23a and 23b can be made easily.

As mentioned above, in the LCD panel module 20, the diffusing plate 27 and the optical sheet 26 are held by the resin chassis 25 and the center chassis 28. In such structure, a rear side of the LCD panel 22 is always protected by the diffusing plate 27 and the optical sheet 26. Therefore, contamination and scratches on the LCD panel 22 can be prevented.

Since the stiffness of the integrated LCD panel module 20 mentioned above increases, deformation and distortion in the LCD panel can be suppressed. According to the integrated module, damage to the wiring board due to an operator's carelessness can be eliminated as well.

In the exemplary embodiment, the resin chassis 25 may includes a hollow portion along an edge of the opening of the center chassis 28. As described with reference to FIG. 4, the optical sheet 26 and the diffusing plate 27 are sandwiched and attached between the hollow of the resin chassis 25 and the center chassis 28. According to the number of the optical sheet 26 and the diffusing plate 27 to be sandwiched and a thickness thereof, the hollow of the resin chassis 25 can be easily adjusted. Therefore, in the exemplary embodiment, positioning in a transverse direction of the optical sheet 26 and the diffusing plate 27 can be conducted easily. When the optical sheet 26 and the diffusing plate 27 are sandwiched by the hollow of resin chassis 25 and the center chassis 28, backlash thereof in a horizontal direction can also be suppressed.

As shown in FIG. 11, in the exemplary embodiment, while covering a part of a side face of the center chassis 28, the resin chassis 25 appears at a part where the grounding electrode of the printed wiring board 23a and the center chassis 28 electrically connect to each other. According to the structure, short-circuiting between the printed wiring board 23a and the center chassis 28 can be prevented by the resin chassis 25.

The exemplary embodiment is described based on the example of the structure of the LCD panel module 20 shown in FIGS. 2 to 4. However, as long as the LCD panel module 20 includes all the structures described below, the LCD panel module 20 can be modified arbitrarily.

That is, the LCD panel module 20 should include the structure described below simultaneously.

(1) The LCD panel 22 is sandwiched by the front chassis 21 and the center chassis 28.

(2) The wiring board 23 (23a, 23b) is attached to the center chassis 28.

(3) The grounding electrode of the wiring board 23 (23a, 23b) is electrically connected to the center chassis 28.

For example, in the configuration example mentioned above with reference to FIGS. 2 to 4, the LCD panel 22 is mounted by the front chassis 21 and the resin chassis 25. Further the optical sheet 26 and the diffusing plate 27 are mounted by the resin chassis 25 and the center chassis 28. However, other structures other than the structure above mentioned are available.

Figure 15:
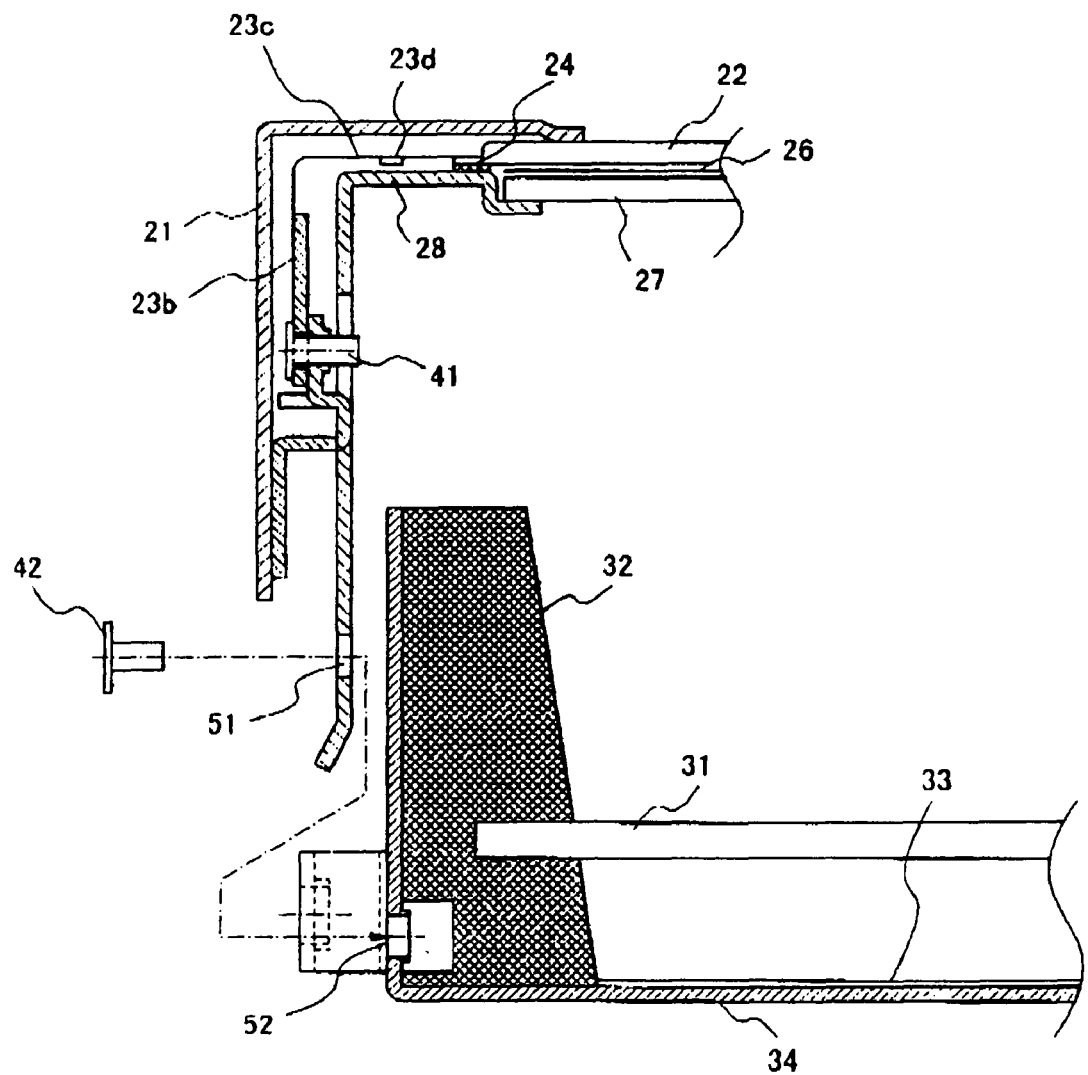
FIG. 15 is a fragmentary sectional view showing a structure of the LCD panel module according to a modification of the first exemplary embodiment of the present invention.

FIG. 15 is a fragmentary sectional view showing a structure of the LCD panel module according to a modification of the first exemplary embodiment of the present invention, and the cross sectional view shows a cross section taken along the X-X line shown in FIG. 1.

FIG. 15 according to the modification shows that the diffusing plate 27, the optical sheet 26 and the LCD panel 22 are held by the front chassis 21 and the center chassis 28. In case of the modification, as shown in FIG. 15, an edge portion along an opening in the center chassis 28 is bent like a crank shape to form a hollow. In the modification, the diffusing plate 27, the optical sheet 26 and the LCD panel 22 which are laminated are arranged in the hollow. Because of such structure, positional displacement between these members is prevented and reliable fixing thereof is performed.

That is, the structure without the resin chassis 25 adopted in the modification can also enjoy the same advantage as that of the first exemplary embodiment.

The Second Embodiment

Next, an LCD panel module and an LCD device having the LCD panel module according to a second exemplary embodiment of the present invention will be described with reference to FIG. 16.

Figure 16:
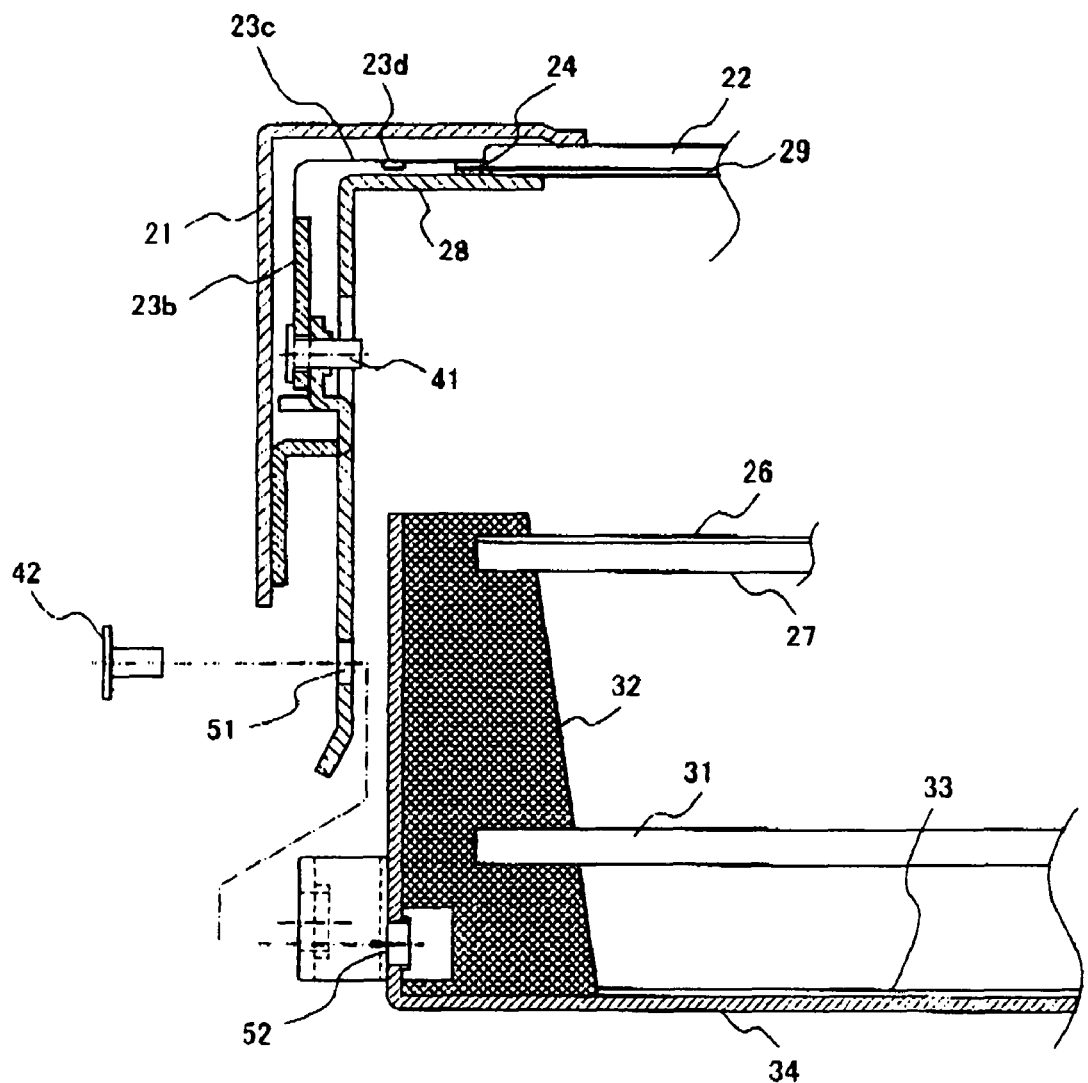
FIG. 16 is a cross sectional view showing connection between an LCD panel module and a backlight according to a second exemplary embodiment of the present invention.

FIG. 16 is a cross sectional view showing an assembling state of an LCD panel module and a backlight according to a second exemplary embodiment of the present invention. In the embodiment, the cross sectional view shows the cross-section approximately taken along X-X line shown in FIG. 1.

In the first exemplary embodiment mentioned above, in order to protect the LCD panel 22, the optical sheet 26 and the diffusing plate 27 are installed in the LCD panel modules. In the second exemplary embodiment, as shown in FIG. 16, a protective sheet 29, as an example of a protective member, is arranged on a rear side of the LCD panel 22. According to the exemplary embodiment having such structure, contamination and scratch on the LCD panel 22 can be prevented by the protective sheet 29 during transportation thereof. As a result, according to the second exemplary embodiment, the optical sheet 26 and the diffusing plate 27 can be mounted in the backlight 30. In this case, the LCD panel 22 is held by the front chassis 21 and the center chassis 28. Accordingly, in the second exemplary embodiment, the resin chassis 25 is unnecessary.

The Third Embodiment

Next, an LCD panel module and an LCD device having the LCD panel module according to a third exemplary embodiment of the present invention will be described with reference to FIG. 17 and FIG. 18.

Figure 17:
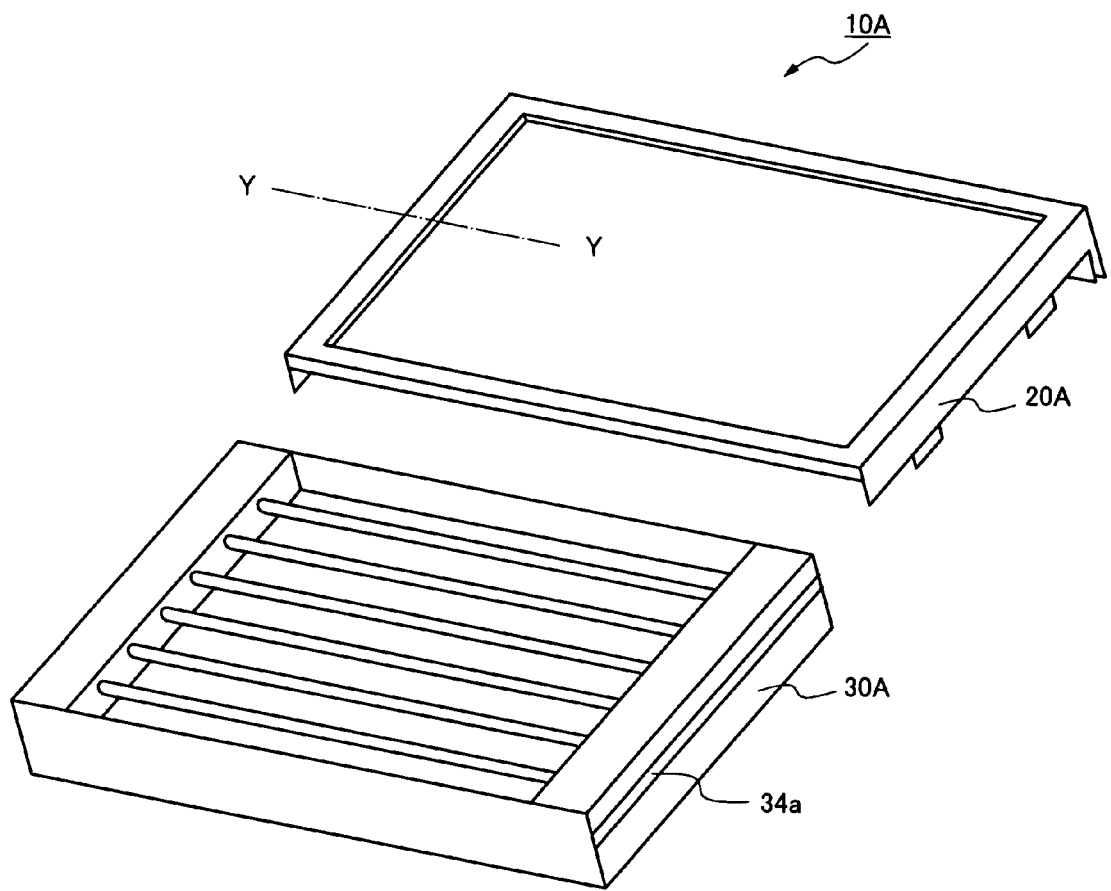
FIG. 17 is a perspective view showing an appearance of an LCD panel module and a backlight which constitute the LCD device according to a third exemplary embodiment of the present invention.

FIG. 17 is a perspective view showing an appearance of an LCD panel module and a backlight which constitute the LCD device according to the third exemplary embodiment of the present invention. FIG. 18 is a cross sectional view showing an example of a fitting structure of the LCD panel module and the backlight according to the third exemplary embodiment of the present invention, and it shows a cross section taken along Y-Y line shown in FIG. 17.

In the first exemplary embodiments mentioned above, as shown in FIG. 6, the center chassis 28 of the LCD panel module 20 and the backlight chassis 34 of the backlight 30 are fitted in a normal direction of the display device. However, in the first exemplary embodiment, the printed wiring board 23a is provided in one side of two long sides of the LCD panel 22 as it had been described with reference to FIG. 2 and FIG. 3. Accordingly, in the third exemplary embodiment, a cut portion can be formed at the one long side in which the printed wiring board 23a is not arranged. Accordingly, a backlight 30A can be fitted in the LCD panel module 20A through the cut portion thereof.

Figure 18:
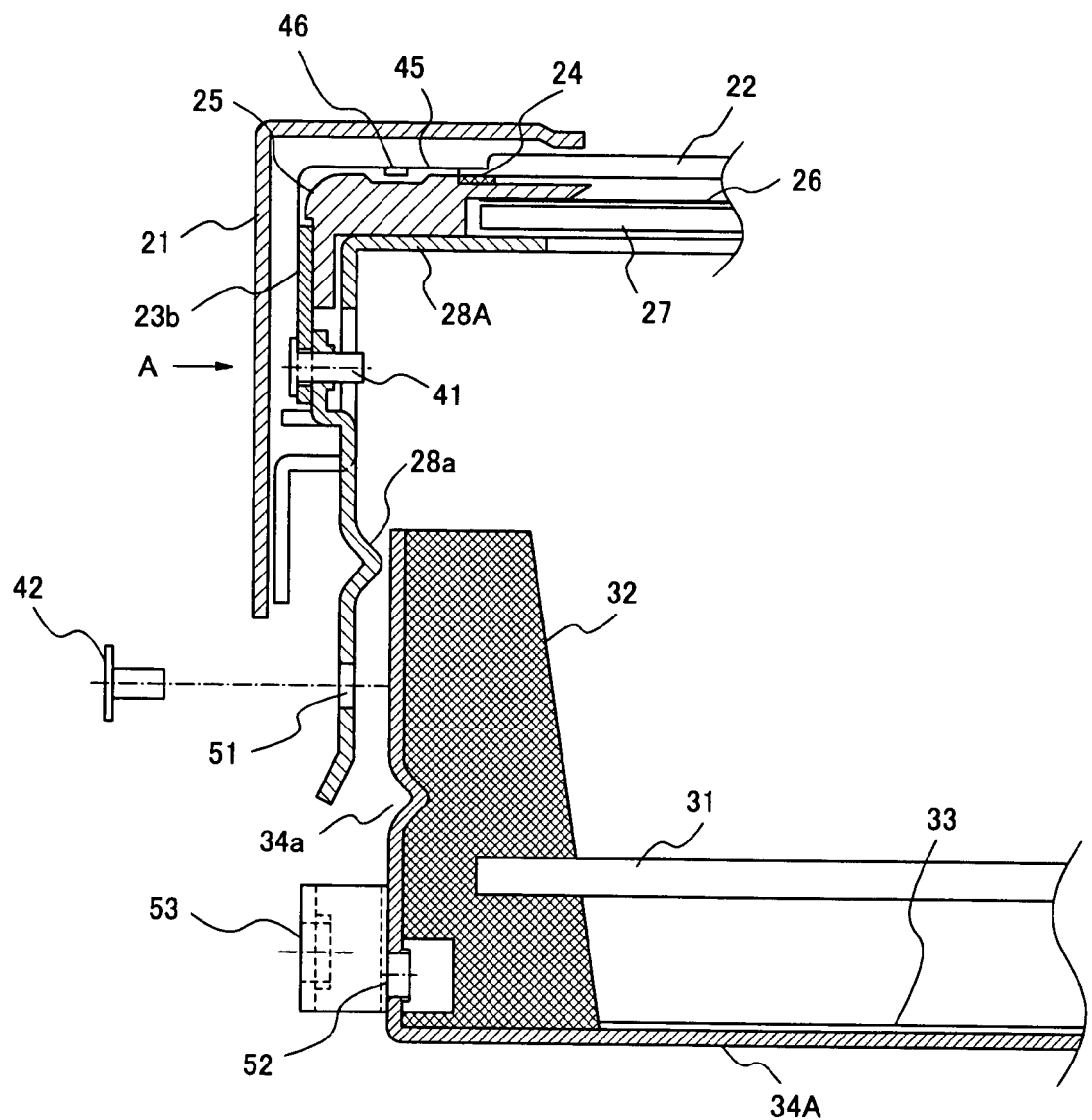
FIG. 18 is a cross sectional view showing an example of a fitting structure of the LCD panel module and the backlight according to the third exemplary embodiment of the present invention.
Figure 19:
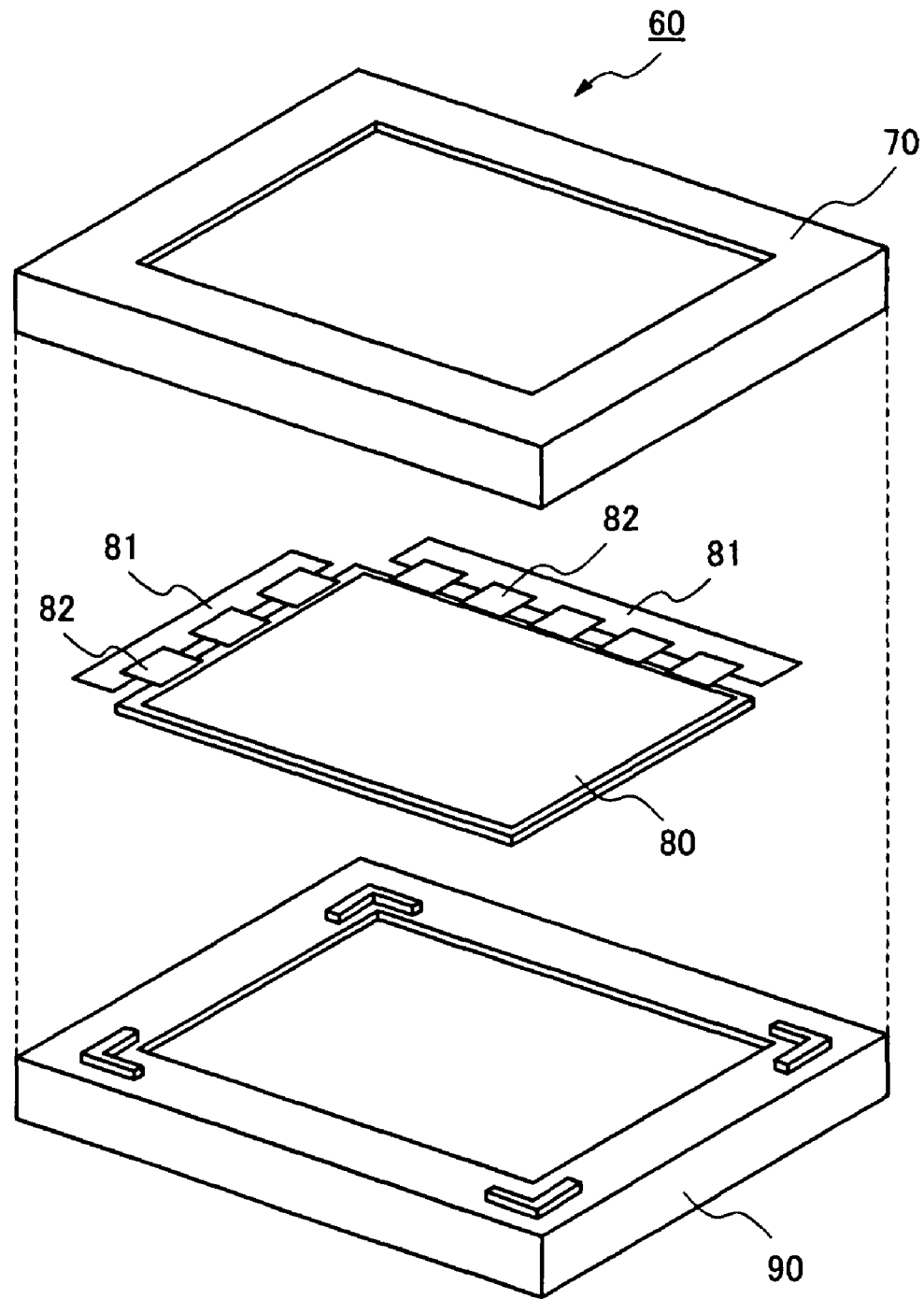
FIG. 19 is an exploded perspective view showing a configuration of an LCD device as a related art.
Figure 20:
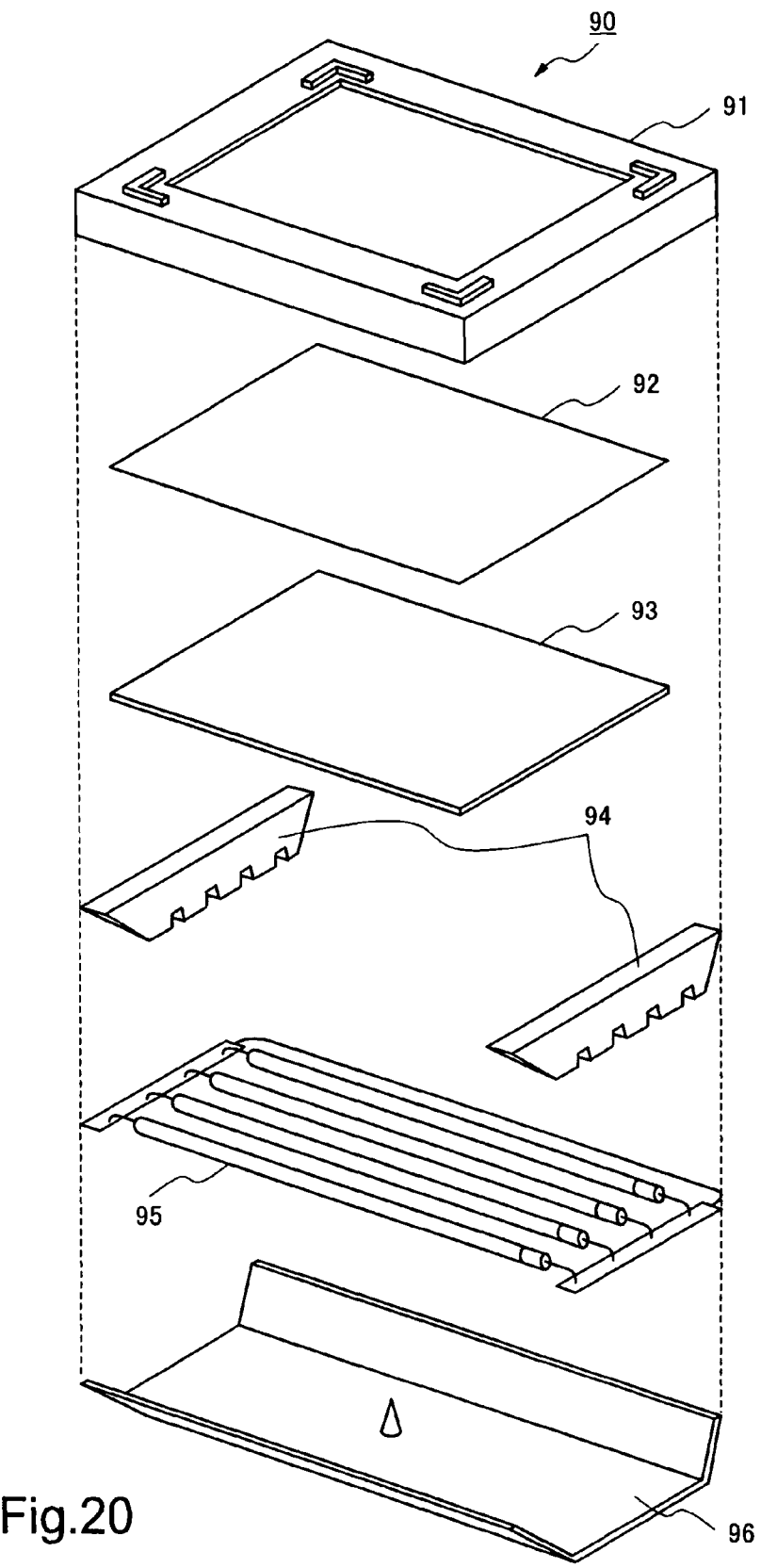
FIG. 20 is an exploded perspective view showing a backlight unit of an LCD device as a related art.

In the case, for example, as shown in FIG. 17 and FIG. 18, a guide groove 34a is formed along the short side of the backlight chassis 34A of the backlight 30A. A projection 28a can be formed in a position on the center chassis 28a opposing to the guide groove 34a of the backlight chassis 34A. While the projection 28a slides along the guide groove 34a, the LCD panel module 20A and the backlight 30A fit to each other. In the third exemplary embodiment, the LCD device 10A can be assembled by such fitting structure.

Further, the fitting structure is not limited to the structure shown in FIG. 17 and FIG. 18. More specifically, for example, in another fitting structure, a guide groove is formed on the center chassis 28A as a second frame-shaped chassis and a projection is formed on a position of the backlight chassis 34A facing the guide groove. In a different fitting structure, an extended tip portion of a center chassis 28A can be bent inward to slidably fit a rear face of the backlight chassis 34A.

In the first to the third exemplary embodiment mentioned above and those modification, the LCD device includes CCFL emitting a light directly under the LCD panel 22, as a light source (lamp 31) of the backlight unit 30 (30A). However, the structure of the LCD panel module 20 (20A) which has been described in each embodiment and the modification mentioned above is not limited to such type of the backlight unit. For example, the structure of the LCD panel module 20 (20A) mentioned above can employ an edge lighting type backlight unit. As a light source, various light sources other than a CCFL, such as an LED and an EEFL can be adopted.

Figure 21:
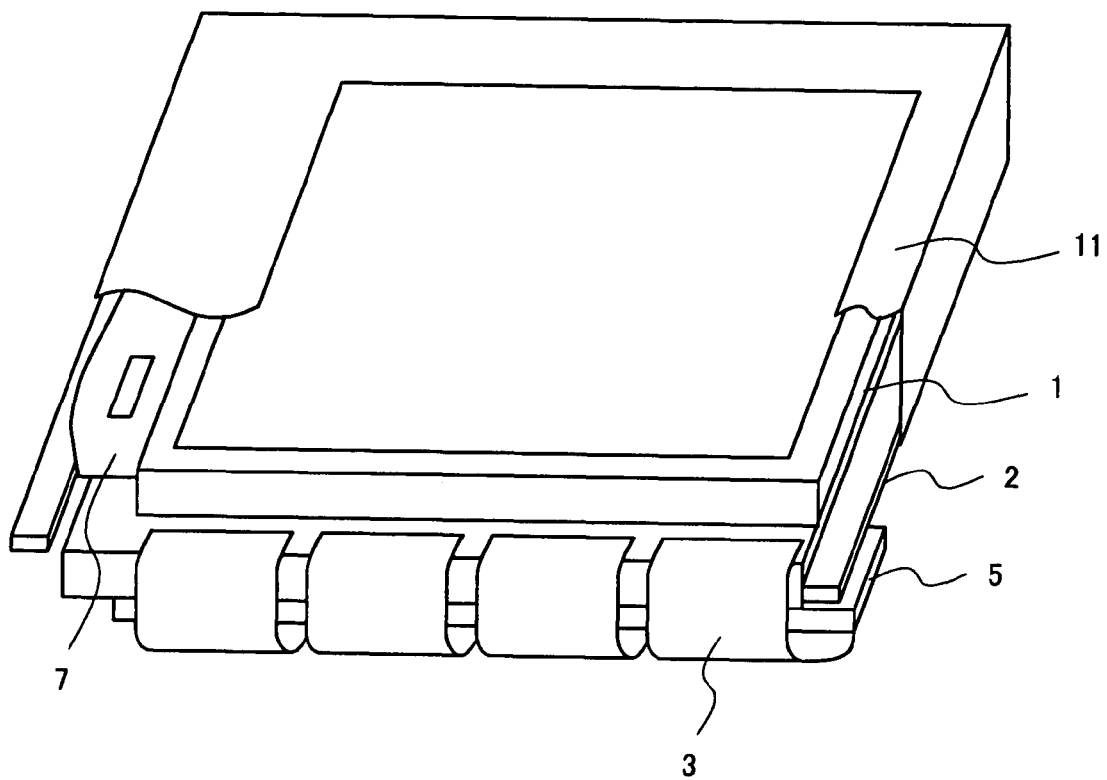
FIG. 21 is a perspective view showing a configuration of an LCD device proposed in Japanese Patent Application Laid-Open No. 1998-148819 as a related art.

In each embodiment and the modification described above, the LCD device 10 (10A) can be separated to the LCD panel module 20 (20A) and the backlight 30 (30A), and the printed wiring board 23 (23a and 23b) is fixed in the LCD panel unit. The LCD device 10 is greatly different from the known LCD device shown in FIG. 21 in which the printed wiring board is fixed on the back side of the backlight unit.

Specifically, each embodiment and the modification mentioned above adopt structures described below:
the LCD panel 22 is sandwiched by the front chassis 21 and the resin chassis 25;
the center chassis 28 (28A) including a stiff member such as a metal is provided on a rear side of the resin chassis 25;
the printed wiring board 23 (23a and 23b) is attached to the center chassis 28 (28A); and.
the front chassis 21, the LCD panel 22, the printed wiring board 23 (23a and 23b), the TCP (or COF) 25 for connecting the printed wiring board 23 and the LCD panel 22, the resin chassis 25 and the center chassis 28 (28A) are integrated into one module (LCD panel modules 20, 20A).

Thereby, according to the LCD device 10 (10A) which adopts structures mentioned above, damage on the LCD panel 22 and the printed wiring board 23 (23a and 23b) can be prevented.

Each embodiment and the modification mentioned above adopt structures described below:
grounding electrode of the printed wiring board 23 (23a and 23b) and the center chassis 28 are electrically connected when the printed wiring board 23 (23a and 23b) is attached to the center chassis 28 formed of an electrically conductive material such as metal by screwing or the like;
grounding electrode of the printed wiring board 23 (23a and 23b) and the backlight 30 are in the same electric potential when the center chassis 28 and the backlight chassis 34 are connected while assembling the LCD panel module 20 and the backlight 30; and
a grounding electrode of the printed wiring board 23 (23a and 23b) and the external device are in the same electric potential when the LCD panel module 20 and the backlight 30 are connected to an external device such as an LCD monitor.

Thereby, the grounding for the printed wiring board 23 (23a and 23b) can be performed easily.

In each embodiment and the modification mentioned above, the optical sheet and the diffusing plate arranged in the backlight unit in a related art are sandwiched by the center chassis 28 (28A) and the resin chassis 25. Thus, according to the LCD panel module 20 (20A) of the invention, a face of the LCD panel 22 facing the backlight can be protected from a contamination and a scratch by dusts.

According to the LCD panel module 20 (20A) mentioned above, when the backlight unit 30 (30A) or the lamp 31 is exchanged for repairing, detaching and attaching of the optical sheet 26 and the diffusing plate 27 are unnecessary. Accordingly, the exchange work for the backlight unit can be performed easily.

Moreover, in the LCD device 10 mentioned above, the center chassis 28 (28A) and the backlight chassis 34 (34A) are fit to each other. According to the LCD device 10 (10A) of the invention, a space-saving is realized and the backlight unit 30 (30A) can be removed easily. That is, easy exchange and repairing for the backlight can be conducted.

Further, the structure itself modularized by holding an LCD panel with a chassis is already disclosed. However, the present invention includes advantageous structures in which the printed wiring board 23 (23a and 23b) is attached to the chassis of the LCD panel and the grounding electrode of the printed wiring board is connected to the chassis electrically.

According to the structure of the present invention, damage on the LCD panel 22 and the printed wiring board 23 can be prevented during a transportation process and an assembling process. According to the structure of the present invention, the grounding of the printed wiring board 23 can be performed easily. Moreover, according to the structure of the present invention, contamination and scratches to the LCD panel 22 can be prevented during a transportation process and an assembling process. And according to the structure of the present invention, because the exchange of the backlight 30 (30A) can be performed easily, a multi-purposed LCD device can be provided.

Further, the present invention described based on each embodiment and the modification mentioned above is applicable in an LCD panel module, an LCD device having the LCD panel module and other various equipment having the LCD device.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A liquid crystal display panel module, comprising:
a liquid crystal display panel in which a liquid crystal layer is sandwiched between a pair of substrates facing each other;
a printed wiring board which is electrically connected to said liquid crystal display panel;
a first frame-shaped chassis which is arranged in front of said liquid crystal display panel; and
a second frame-shaped chassis which is electrically conductive and arranged behind of said liquid crystal display (LCD) panel,
wherein said liquid crystal display panel is held by said first chassis and said second chassis,
wherein said second chassis and a grounding electrode of said printed wiring board are electrically connected by attaching said printed wiring board to said second chassis such that said printed wiring board is arranged along an outer side surface of said second chassis, wherein said second frame-shaped chassis is configured to receive light from an exterior backlight unit provided opposite from said first frame-shaped chassis, and wherein said outer side surface of the second frame-shaped chassis is arranged perpendicular to a principal surface of the liquid crystal display panel and parallel to a principal surface of the grounding electrode.

2. The liquid crystal display panel module according to claim 1, further comprising at least one of an optical sheet and a diffusing plate for homogenizing the light which illuminates a rear side of said liquid crystal display panel, wherein at least one of said optical sheet and said diffusing plate is placed on the rear side of said liquid crystal display panel, and is held by said first chassis and said second chassis together with said liquid crystal display panel.

3. The liquid crystal display panel module according to claim 1, further comprising a protective member which protects a rear side of said liquid crystal display panel, wherein said protective member is placed on the rear side of the liquid crystal display panel, and is held by said first chassis and said second chassis together with said liquid crystal display panel.

4. The liquid crystal display panel module according to claim 1, wherein said printed wiring board and said second chassis are connected physically and electrically by screwing said printed wiring board to said second chassis with a screw arranged in a through-hole formed in a grounding electrode of said printed wiring board.

5. The liquid crystal display panel module according to claim 1, wherein said first chassis is electrically conductive, and wherein said first chassis and said second chassis are electrically connected by physical attachment therebetween, thereby said printed wiring board, said first chassis, and said second chassis are in an equal electric potential.

6. The liquid crystal display panel module according to claim 1, wherein said printed wiring board is electrically connected to said liquid crystal display panel via a flexible substrate.

7. A liquid crystal display device, comprising said liquid crystal display panel module according to claim 1, wherein the exterior backlight unit fits into said liquid crystal panel module and illuminates said liquid crystal display panel module from a rear side thereof.

8. The liquid crystal display device according to claim 7, wherein said backlight unit includes a light source and a fourth chassis for holding the light source therein, said fourth chassis being electrically conductive, and wherein said second chassis and said fourth chassis are electrically connected by physical attachment therebetween, thereby said printed wiring board, said first chassis, said second chassis and said fourth chassis are in an equal electric potential.

9. A liquid crystal display panel module, comprising:

a liquid crystal display panel in which a liquid crystal layer is sandwiched between a pair of substrates facing each other;

a printed wiring board which is electrically connected to said liquid crystal display panel;

a first frame-shaped chassis which is arranged in front of said liquid crystal display panel;

a second frame-shaped chassis which is arranged behind of said liquid crystal display panel and is electrically conductive;

a third frame-shaped chassis which is arranged between said first chassis and said second chassis; and at least one of an optical sheet and a diffusing plate for homogenizing a light which illuminates a rear side of said liquid crystal display panel, wherein said liquid crystal display panel is held by said first chassis and said third chassis, wherein at least one of the optical sheet and the diffusing plate is held by said second chassis and said third chassis, wherein a grounding electrode of said printed wiring board and said second chassis are electrically connected by attaching said printed wiring board to said second chassis such that said printed wiring board is arranged along an outer side surface of said second chassis, wherein said second frame-shaped chassis is configured to receive light from an exterior backlight unit provided opposite from said first frame-shaped chassis, and wherein said outer side surface of the second frame-shaped chassis is arranged perpendicular to a principal surface of the liquid crystal display panel and parallel to a principal surface of the grounding electrode.

10. The liquid crystal display panel module according to claim 9, wherein said third chassis comprises a resin structure.

11. The liquid crystal display panel module according to claim 10, wherein said printed wiring board and said second chassis are attached via said third chassis at a different portion from the grounding electrode of said printed wiring board.

12. The liquid crystal display panel module according to claim 9, wherein said printed wiring board and said second chassis are connected physically and electrically by screwing said printed wiring board to said second chassis with a screw arranged in a through-hole formed in a grounding electrode of said printed wiring board.

13. The liquid crystal display panel module according to claim 9, wherein said first chassis is electrically conductive, and wherein said first chassis and said second chassis are electrically connected by physical attachment therebetween, thereby said printed wiring board, said first chassis, and said second chassis are in an equal electric potential.

14. The liquid crystal display panel module according to claim 9, wherein said printed wiring board is electrically connected to said liquid crystal display panel via a flexible substrate.

15. A liquid crystal display device, comprising said liquid crystal display panel module according to claim 9, wherein said backlight unit fits into said liquid crystal panel module and illuminates at least one of the optical sheet and the diffusing plate in a rear side of said liquid crystal display panel.

16. The liquid crystal display device according to claim 15, wherein said backlight unit includes a light source and a fourth chassis for holding the light source therein, said fourth chassis being electrically conductive, and wherein said second chassis and said fourth chassis are electrically connected by physical attachment therebetween, thereby said printed wiring board, said first chassis, said second chassis, and said fourth chassis are in an equal electric potential.

17. The liquid crystal display panel module according to claim 2, wherein the second frame-shaped chassis engages with a resin chassis to sandwich the at least one of the optical sheet and the diffusing plate therebetween.

18. The liquid crystal display panel module according to claim 1, wherein an internal surface of the second frame-shaped chassis is fitted into an outer surface of the backlight unit which forms an outer shape of the backlight unit.

19. The liquid crystal display panel module according to claim 1, wherein the second frame-shaped chassis engages with the first frame-shaped chassis to sandwich the liquid crystal display panel therebetween.

20. The liquid crystal display panel module according to claim 1, wherein the second frame-shaped chassis comprises a conductive part which electrically connects with the printed wiring board; the first frame-shaped chassis, and the backlight unit.

21. The liquid crystal display panel module according to claim 1, wherein the second frame-shaped chassis comprises one of edge portions of a flat plate bent in a substantially right angle and an upper face thereof includes an opening through which the light from the backlight unit illuminates the LCD panel.

22. The liquid crystal display panel module according to claim 21, further comprising a diffusing plate and an optical sheet, said diffusing plate or said optical sheet touching the upper face of the second frame-shaped chassis and covering the opening.

23. The liquid crystal display panel module according to claim 22, wherein the diffusing plate is arranged on the upper face of the second frame-shaped chassis, and wherein the optical sheet is arranged on the diffusing plate.

24. The liquid crystal display panel module according to claim 9, wherein the diffusing plate and the optical sheet are held by the third frame-shaped chassis arranged so that an edge portion of the second frame-shaped chassis is covered thereby, and is fixed to cover an opening of the second frame-shaped chassis.

25. The liquid crystal display panel module according to claim 1, wherein the grounding electrode faces the outer side surface.

26. The liquid crystal display panel module according to claim 1, wherein a projecting portion having an elastic property is formed in a position of the second frame-shaped chassis corresponding to the grounding electrode.

27. The liquid crystal display panel module according to claim 26, wherein the printed wiring board and the second frame-shaped chassis are fixed by a fixing screw and the grounding electrode of the printed wiring board electrically contacts the projecting portion.

* * * * *